US008861377B2

(12) United States Patent
Okuyama et al.

(10) Patent No.: US 8,861,377 B2
(45) Date of Patent: Oct. 14, 2014

(54) TRANSMISSION MANAGEMENT SYSTEM, PROGRAM, COMPUTER READABLE INFORMATION RECORDING MEDIUM, PROGRAM PROVIDING SYSTEM, AND MAINTENANCE SYSTEM

(75) Inventors: Taro Okuyama, Tokyo (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/883,018

(22) PCT Filed: Nov. 29, 2011

(86) PCT No.: PCT/JP2011/078008
§ 371 (c)(1),
(2), (4) Date: May 2, 2013

(87) PCT Pub. No.: WO2012/074124
PCT Pub. Date: Jun. 7, 2012

(65) Prior Publication Data
US 2013/0223292 A1 Aug. 29, 2013

(30) Foreign Application Priority Data

Nov. 30, 2010 (JP) ................................. 2010-267744
Sep. 30, 2011 (JP) ................................. 2011-217039

(51) Int. Cl.
*H04L 12/26* (2006.01)
*H04M 3/493* (2006.01)
*H04L 29/06* (2006.01)
*H04M 3/56* (2006.01)

(52) U.S. Cl.
CPC ....... *H04L 29/06326* (2013.01); *H04M 3/4931* (2013.01); *H01L 67/327* (2013.01); *H04L 65/1069* (2013.01); *H04M 2203/6009* (2013.01); *H04L 65/403* (2013.01); *H04L 29/06414* (2013.01); *H04M 3/567* (2013.01)
USPC .......................................... 370/247; 370/244

(58) Field of Classification Search
USPC ...................... 370/247, 241.1, 244, 251, 252
See application file for complete search history.

(56) References Cited

U.S. PATENT DOCUMENTS 6,597,683 B1 * 7/2003 Gehring et al. ............... 370/348
7,191,214 B2 3/2007 Watanabe
(Continued)

FOREIGN PATENT DOCUMENTS

JP H07-058898 3/1995
JP H07-245656 9/1995
(Continued)

OTHER PUBLICATIONS

Singaporean Written Opinion issued Jul. 19, 2013 in Patent Application No. 201303097-8.
(Continued)

*Primary Examiner* — Hassan Phillips
*Assistant Examiner* — Siren Wei
(74) *Attorney, Agent, or Firm* — Oblon, Spivak, McClelland, Maier & Neustadt, L.L.P.

(57) ABSTRACT

A transmission management system receives, from a request source terminal which is an addition request source requesting to add a certain transmission terminal as a destination candidate, an addition request for the destination candidate, identification information of the request source terminal and identification information of a request target terminal which is an addition request target of the destination candidate; and informs the request target terminal of an approval request for requesting the request target terminal to approve the addition request, and the identification of the request source terminal. The system receives an addition request response from the request target terminal in response to the addition request. When the addition request response indicates to approve the addition request, the system additionally associates the identification information of the request target terminal with the identification information of the request source terminal as the identification information of the destination terminal.

6 Claims, 28 Drawing Sheets

(56) References Cited

U.S. PATENT DOCUMENTS

| | | |
|---|---|---|
| 2002/0073207 A1* | 6/2002 | Widger et al. ............... 709/227 |
| 2002/0126654 A1* | 9/2002 | Preston et al. ............... 370/352 |
| 2004/0122901 A1 | 6/2004 | Sylvain |
| 2005/0120084 A1 | 6/2005 | Hu et al. |
| 2006/0123077 A1* | 6/2006 | Munetsugu et al. ......... 709/203 |
| 2007/0064920 A1 | 3/2007 | Ruckart |
| 2007/0100944 A1* | 5/2007 | Ford et al. ................... 709/206 |
| 2008/0292080 A1 | 11/2008 | Quon |
| 2010/0211634 A1* | 8/2010 | Song et al. ................... 709/203 |
| 2011/0102148 A1* | 5/2011 | Laffey et al. ................ 340/10.1 |
| 2013/0166718 A1 | 6/2013 | Okuyama et al. |

FOREIGN PATENT DOCUMENTS

| | | |
|---|---|---|
| JP | H08-256145 | 10/1996 |
| JP | H08-317364 | 11/1996 |
| JP | 2003-060772 | 2/2003 |
| JP | 2003-224662 | 8/2003 |
| JP | 2003-298494 | 10/2003 |
| JP | 2006-074453 | 3/2006 |

OTHER PUBLICATIONS

MSN Messenger Version 8.5.1235, Release Date Nov. 6, 2007 (Downloadable from e.g. http://www.oldversion.com/windows/msn-messenger-8-5-1235) (Submitting Webpage Snapshot only), 2 pages.

International Search Report Issued Feb. 21, 2012 in PCT/JP2011/078008 Filed Nov. 29, 2011.

International Preliminary Report on Patentability and Written Opinion of the International Searching Authority, dated Jun. 4, 2013, for International Application No. PCT/JP2011/078008 filed Nov. 29, 2011.

European Search Report for European Application No. 11844064.3 dated Apr. 7, 2014.

* cited by examiner

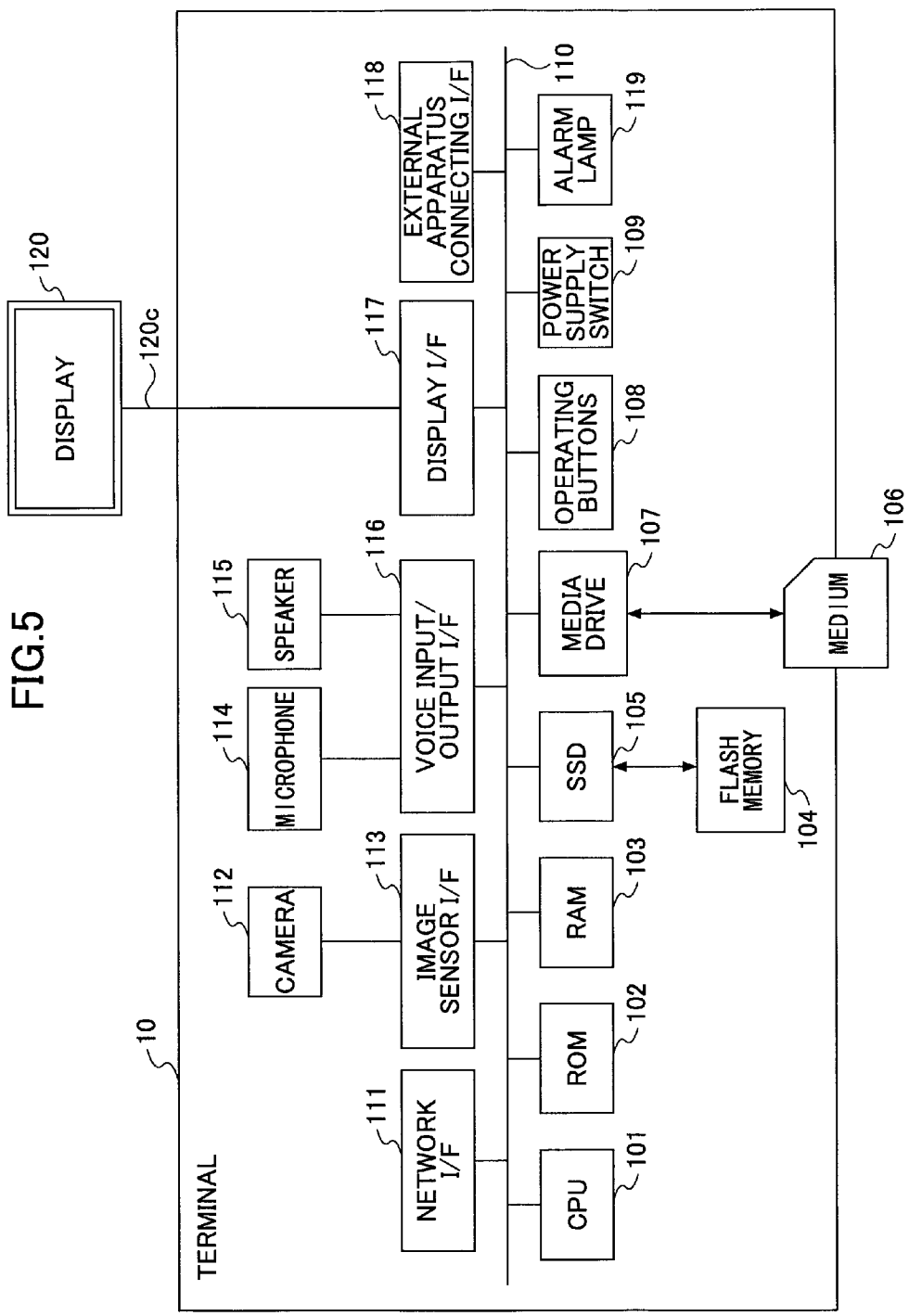

FIG.8

| TERMINAL ID | PASSWORD |
|---|---|
| 01aa | aaaa |
| 01ab | abab |
| 01ba | baba |
| ... | ... |

FIG.9

| TERMINAL ID | TERMINAL NAME | OPERATING STATE | RECEPTION DATE AND TIME | IP ADDRESS OF TERMINAL |
|---|---|---|---|---|
| 01aa | JAPAN TOKYO OFFICE AA TERMINAL | ON-LINE (TRANSMISSION POSSIBLE) | 2009.11.10.13:40 | 1.2.1.3 |
| 01ab | JAPAN TOKYO OFFICE AB TERMINAL | OFF-LINE | 2009.11.09.12:00 | 1.2.1.4 |
| ... | ... | ... | ... | ... |
| 01ba | JAPAN OSAKA OFFICE BA TERMINAL | ON-LINE (TEMPORARILY INTERRUPTED) | 2009.11.10.13:45 | 1.2.2.3 |
| 01bb | JAPAN OSAKA OFFICE BB TERMINAL | ON-LINE (TRANSMISSION POSSIBLE) | 2009.11.10.13:50 | 1.2.2.4 |
| ... | ... | ... | ... | ... |
| 01ca | USA NEW YORK OFFICE CA TERMINAL | OFF-LINE | 2009.11.10.12:45 | 1.3.1.3 |
| 01cb | USA NEW YORK OFFICE CB TERMINAL | ON-LINE (ON TRANSMISSION) | 2009.11.10.13:55 | 1.3.1.4 |
| ... | ... | ... | ... | ... |
| 01da | USA WASHINGTON OFFICE DA TERMINAL | ON-LINE (ON TRANSMISSION) | 2009.11.08.12:45 | 1.3.2.3 |
| 01db | USA WASHINGTON OFFICE DB TERMINAL | ON-LINE (TRANSMISSION POSSIBLE) | 2009.11.10.12:45 | 1.3.2.4 |
| ... | ... | ... | ... | ... |

FIG.10

| REQUEST SOURCE TERMINAL ID | DESTINATION TERMINAL ID |
|---|---|
| 01aa | 01ab,···,01ba,01bb,···,01ca,01cb,01da,01db |
| 01ab | 01aa,01ca,01cb |
| 01ba | 01aa,01ab,01ca,01cb,01da,01db |
| ⋮ | ⋮ |
| 01db | 01aa,01ab,01da,···,01da,01ca,01cb,···,01da |

FIG.11

| REQUEST SOURCE TERMINAL ID | REQUEST TARGET TERMINAL ID |
|---|---|
| 01aa | 01dc |
| 01ab | 01ca |
| 01ab | 01da |
| ... | ... |

| TERMINAL NAME | TERMINAL ID | OPERATION |
|---|---|---|
| JAPAN TOKYO OFFICE AB TERMINAL | 10ab | EDIT | DELETE |
| JAPAN TOKYO OFFICE AC TERMINAL | 10ac | EDIT | DELETE |
| JAPAN TOKYO OFFICE AD TERMINAL | 10ad | EDIT | DELETE |
| JAPAN TOKYO OFFICE AE TERMINAL | 10ae | EDIT | DELETE |

ADD DESTINATION

FIG.23

| TERMINAL NAME | TERMINAL ID | OPERATION |
|---|---|---|
| JAPAN TOKYO OFFICE AB TERMINAL | 10ab | EDIT \| DELETE |
| JAPAN TOKYO OFFICE AC TERMINAL | 10ac | EDIT \| DELETE |
| JAPAN TOKYO OFFICE AD TERMINAL | 10ad | EDIT \| DELETE |
| JAPAN TOKYO OFFIC... | | |

ADD DESTINATION

ADD TRANSMISSION TERMINAL IN DESTINATION LIST

TERMINAL ID :

TERMINAL NAME :

SEARCH

TRANSMIT ADDITION REQUEST

CANCEL

Sc4

TRANSMISSION MANAGEMENT SYSTEM, PROGRAM, COMPUTER READABLE INFORMATION RECORDING MEDIUM, PROGRAM PROVIDING SYSTEM, AND MAINTENANCE SYSTEM

TECHNICAL FIELD

The present invention relates to a configuration for managing communication between a certain request source terminal and a certain destination terminal from among certain transmission terminals by informing the destination terminal which is a start request target for the telephone call of a start request for the telephone call from the request source terminal.

BACKGROUND ART

Recently, along with a recent tendency of reducing business trip costs and business trip man hours, transmission systems for carrying out a TV conference using a communication network such as the Internet have become spread. In such a transmission system, when a telephone call is carried out between plural transmission terminals, image data and voice data are transmitted therebetween, and thus, a TV conference can be carried out.

Further, by displaying a destination list on the side of a request source terminal which is a request source of a telephone call for the purpose that the user of the request source terminal can easily select a desired destination terminal from among plural candidates for the telephone call, the user of the request source terminal can select the desired destination terminal (see Japanese Laid-Open Patent Application No. 2006-074453).

However, a first user may be troubled when a second user registers the transmission terminal of the first user in the second user's destination list without approval from the first user, and the first user receives a start request for a telephone call from the second user.

SUMMARY OF INVENTION

According to an embodiment of the present invention, a transmission management system manages communication between a request source terminal and a destination terminal from among plural transmission terminals, by sending a start request for the communication from the request source terminal which is a start request source terminal to the destination terminal which is a start request target for the communication. The transmission management system includes a destination list management part configured to manage a destination list indicating a candidate for a destination of the request source terminal, by associating, for identification information of the request source terminal, identification information of the destination terminal which is the destination candidate capable of carrying out the communication with the request source terminal; a reception part configured to receive, from the request source terminal which is an addition request source requesting to add a certain transmission terminal as a destination candidate, an addition request for the destination candidate, the identification information of the request source terminal and the identification information of a request target terminal which is an addition request target for the destination candidate; and a transmission part configured to inform the request target terminal of an approval request for requesting the request target terminal to approve the addition request, and transmitting the identification of the request source terminal. The reception part is configured to receive the addition request response from the request target terminal in response to the addition request, and in a case where the addition request response indicates to approve the addition request, the destination list management part is configured to additionally associate the identification information of the request target terminal as the identification information of the destination terminal with the identification information of the request source terminal, and manage the identification information.

Other objects, features and advantages of the present invention will become more apparent from the following detailed description when read in conjunction with the accompanying drawings.

BRIEF DESCRIPTION OF DRAWINGS

FIG. 5 shows a hardware configuration of a transmission terminal according to the first embodiment;

FIG. 8 shows a concept of a terminal authentication management table;

FIG. 9 shows a concept of a terminal management table;

FIG. 10 shows a concept of a destination list management table;

FIG. 11 shows a concept of an addition request management table;

FIG. 13 shows a concept of a destination list;

FIG. 22 shows a concept of a destination list;

FIG. 23 shows a concept of an addition request reception screen page;

DESCRIPTION OF EMBODIMENTS

According to an embodiment of the present invention, before a destination candidate is included in a destination list, a management system inquires of a transmission terminal corresponding to the destination candidate whether inclusion of the transmission terminal in the destination list is approved. Thereby, the user's own transmission terminal can be prevented from being included in the destination list of another person without approval from the user.

Below, with reference to figures, embodiments of the present invention will be described.

[First Embodiment]

With reference to FIGS. 1 through 18, a first embodiment of the present invention will now be described.

<<Overall Configuration of First Embodiment>>

Figure 1:
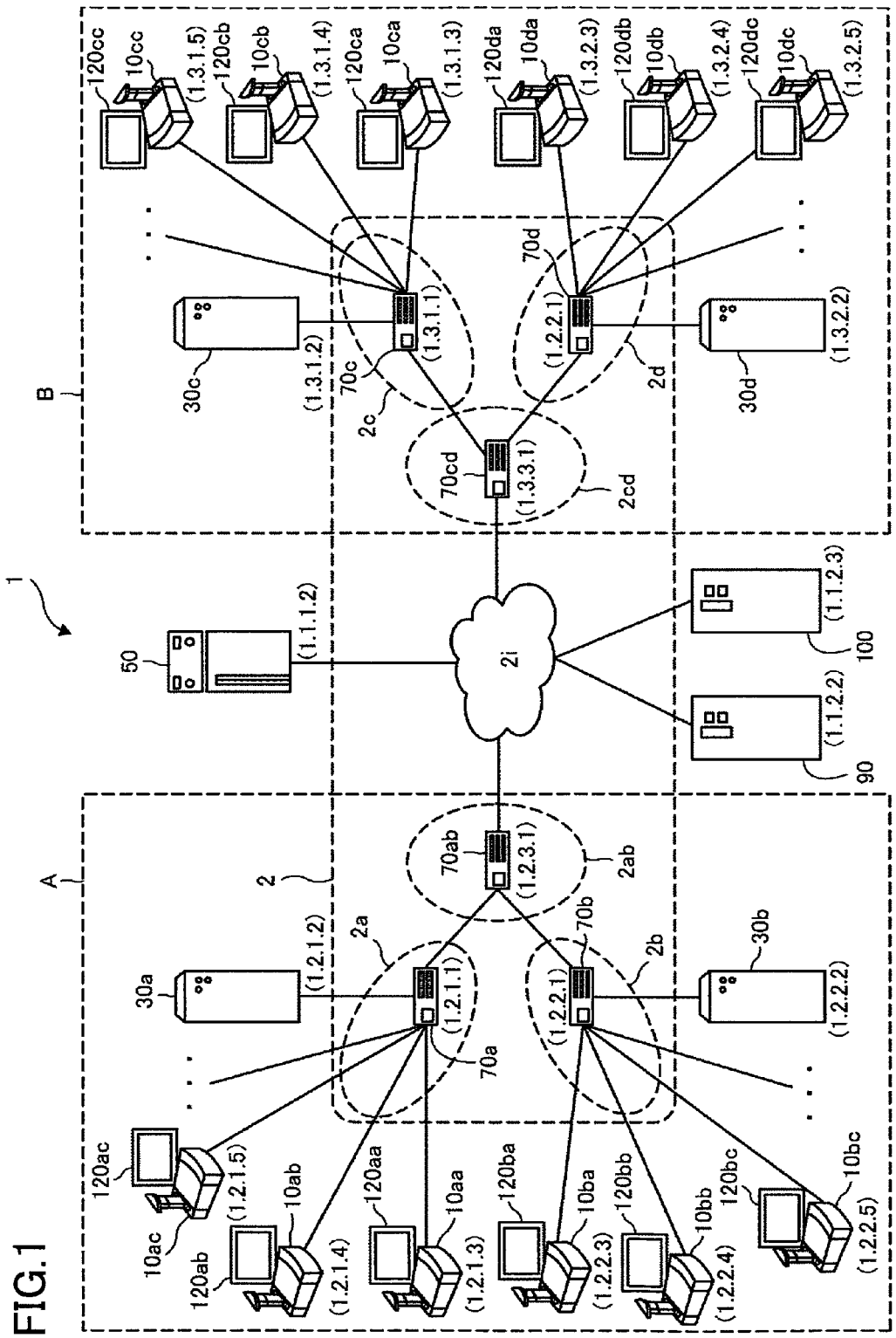
FIG. 1 is a general view of a transmission system according to a first embodiment of the present invention.
Figure 2:
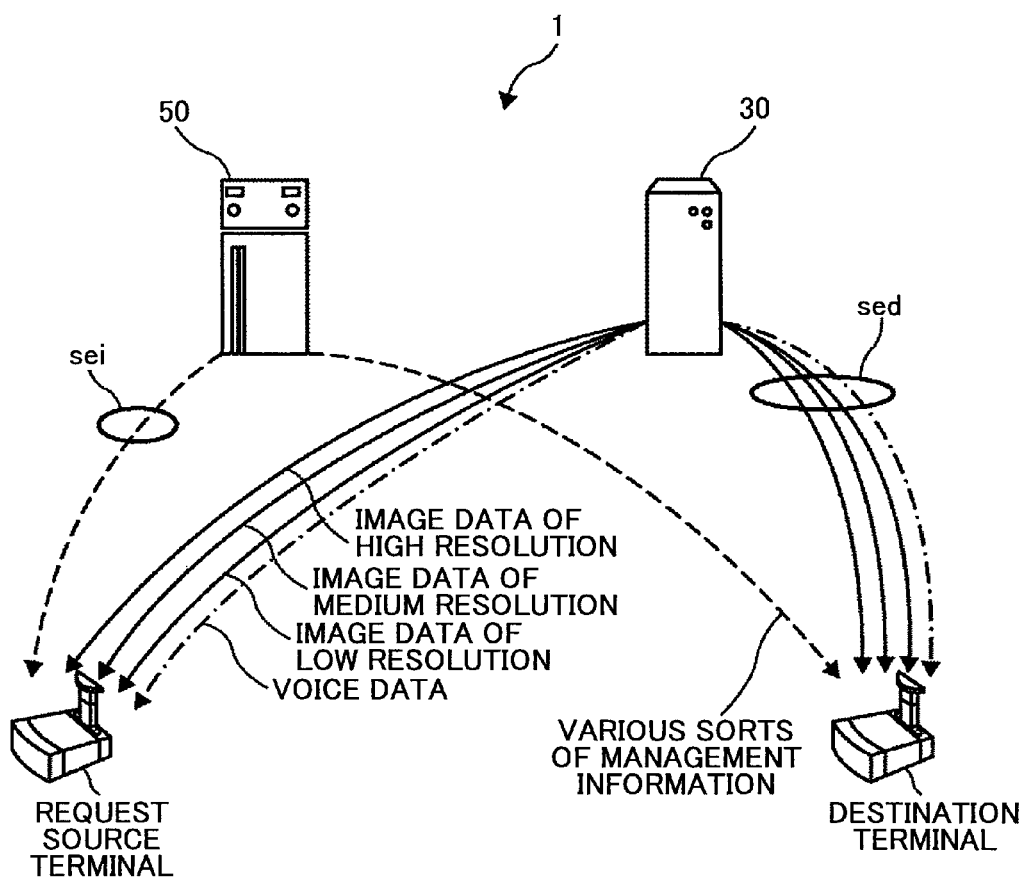
FIG. 2 is a general view showing a state where image data, voice data and various sorts of management information are transmitted in the transmission system.
Figure 3C:
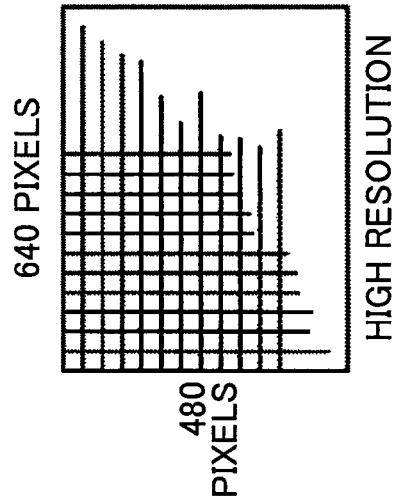
FIG. 3C illustrates a concept of image quality of image data (high resolution)
Figure 3B:
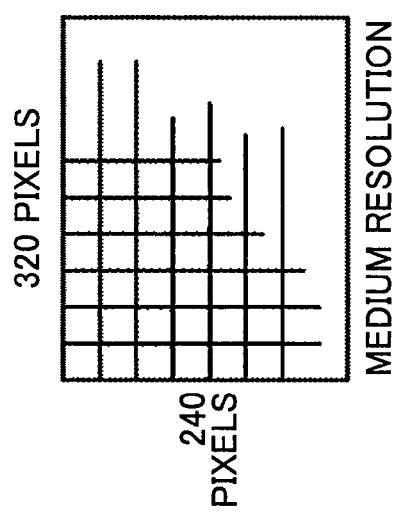
FIG. 3B illustrates a concept of image quality of image data (medium resolution)
Figure 3A:
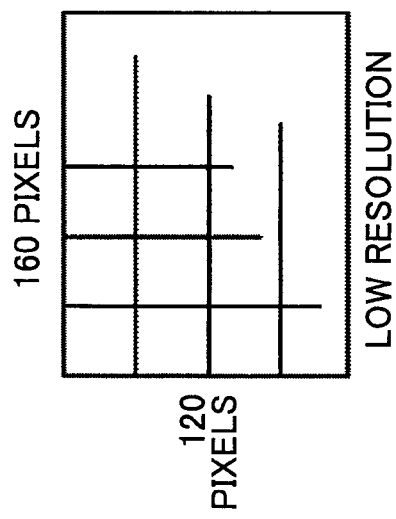
FIG. 3A illustrates a concept of image quality of image data (low resolution)

FIG. 1 shows a general configuration of a transmission system according to the first embodiment of the present invention. FIG. 2 shows a concept of a state where image data, voice data and various sorts of management information are transmitted and received in the transmission system. FIGS. 3A, 3B and 3C illustrate a concept of image quality of image data.

The transmission system 1 may be a communication system mutually transmitting information, feelings or such between plural transmission terminals 10 via a transmission management system 50. The communication system is a system for mutually transmitting information, feelings or such between plural communication terminals (corresponding to "transmission terminals") via a communication management system (corresponding to a "transmission management system"), and may be used as a TV conference system, a teleconference system or such, for example.

According to the first embodiment, the transmission system, the transmission management system and the transmission terminals will be described supposing a TV conference system as one example of the communication system, supposing a TV conference management system as one example of the communication management system and supposing a TV conference terminal as one example of the communication terminal. That is, the transmission terminals and the transmission management system according to the first embodiment of the present invention may be applied not only to a TV conference system, but also another communication system. It is noted that the above-mentioned "TV conference" may also be called "video conference" or such.

Further, according to the first embodiment, a case will be described where respective users of the transmission system 1 belong to four offices, i.e., a Tokyo office (users "a"), an Osaka office (users "b"), a New York office (users "c") and a Washington, D.C. office (users "d").

The transmission system 1 shown in FIG. 1 includes plural transmission terminals (10aa, 10ab, . . . ), display devices (120aa, 120ab, . . . ) for the respective transmission terminals (10aa, 10ab, . . . ), plural relay apparatuses (30a, 30b, 30c and 30d), a transmission management system 50, a program providing system 90 and a maintenance system 100.

The plural transmission terminals (10aa, 10ab, . . . ) carry out transmission and reception of image data and voice data as one example of content data.

It is noted that hereinafter, "transmission terminals" may be simply referred to as "terminals". Further, any terminal of the plural terminals (10aa, 10ab, . . . ) may be referred to as a "terminal 10". Any display device of the plural display devices (120aa, 120ab, . . . ) may be referred to as a "display device 120". Any one of the plural relay apparatuses (30a, 30b, 30c and 30d) may be referred to as a "relay apparatus 30". Further, the terminal acting as a request source requesting a start of a TV conference may be referred to as a "request source terminal", and the terminal acting as a destination (relay destination) which is a request target may be referred to as a "destination terminal".

Further, as shown in FIG. 2, in the transmission system 1, between a transmission source terminal and a destination terminal, a management information session "sei" is established for transmitting various sorts of management information via the transmission management system 50. Further, between the request source terminal and the destination terminal, four sessions are established for transmitting four sorts of data, i.e., image data of high resolution, image data of medium resolution, image data of low resolution and voice data, respectively, via the relay apparatus 30. These four sessions may be collectively referred to as an image and voice data session "sed" (i.e., a session for image data and voice data).

Resolution of image data used in the first embodiment will now be described. As shown in FIG. 3A, an image of low resolution as a base image has a configuration of 160 pixels (in a horizontal direction) by 120 pixels (in a vertical direction). As shown in FIG. 3B, an image of medium resolution has a configuration of 320 pixels (in the horizontal direction) by 240 pixels (in the vertical direction). As shown in FIG. 3C, an image of high resolution has a configuration of 640 pixels (in the horizontal direction) by 480 pixels (in the vertical direction). In a case where a narrow band path is used, image data of low image quality including only image data of low resolution as a base image is relayed. In a, case where a band is relatively wide, image data of medium image quality including image data of low resolution as a base image and image data of medium resolution is relayed. In a case where a band is very wide, image data of high image quality including image data of low resolution as a base image, image data of medium resolution and image data of high resolution is relayed.

The relay apparatuses 30 shown in FIG. 1 carry out relaying of content data between the plural terminals 10. The transmission management system 50 manages, in a unifying manner, login authentication requested by the terminals 10, management of telephone-call situations of the terminals 10, management of a destination list, communication situations of the relay apparatuses 30, and so forth. It is noted that images of the image data may be video (moving picture)

images or static images, and may include both video (moving picture) images and static images.

Plural routers (70a, 70b, 70c, 70d, 70ab, 70cd) select optimum paths for image data and voice data. It is noted that hereinafter, any one of the plural routers (70a, 70b, 70c, 70d, 70ab, 70cd) may be referred to as a "router 70".

The program providing system 90 includes a HD (Hard Disk) 204 (described later), stores a program for the terminals 10 for each of the terminals 10 to carry out various functions (or causing each of the terminals 10 to function as various functional parts), and is capable of transmitting the program for the terminals to each of the terminals 10. Further, the HD 204 of the program providing system 90 also stores a program for the relay apparatuses 30 for each of the relay apparatuses 30 to carryout various functions (or causing each of the relay apparatuses 30 to function as various functional parts), and capable of transmitting the program for the relay apparatuses to each of the relay apparatuses 30. Further, the HD 204 of the program providing system 90 also stores a program for transmission management for the transmission management system 50 to carry out various functions (or causing the transmission management system 50 to function as various functional parts), and capable of transmitting the program for transmission management to the transmission management system 50.

The maintenance system 100 is a computer carrying out maintenance or management of at least one of the terminals 10, the relay apparatuses 30, the transmission management system 50 and the program providing system 90. For example, in a case where the maintenance system 100 is installed in the home country, and the terminals 10, the relay apparatuses 30, the management system 50 or the program providing system 90 are (is) installed abroad, the maintenance system 100 carries out maintenance, management or such of at least one of the terminals 10, the relay apparatuses 30, the management system 50 and the program providing system 90 remotely via a communication network 2. Further, the maintenance system 100 carries out maintenance such as management or such of a model number, a production number, a sales destination, maintenance inspection or a history of failures of at least one of the terminals 10, the relay apparatuses 30, the management system 50 and the program providing system 90 without using the communication network 2.

The terminals (10aa, 10ab, 10ac, . . . ), the relay, apparatuses 30a and the router 70a are connected together by a LAN 2a in such a manner that they can carry out mutual communication. The terminals (10ba, 10bb, 10bc, . . . ), the relay apparatus 30b and the router 70b are connected together by a LAN 2b in such a manner that they can carry out mutual communication. The LAN 2a and the LAN 2b are connected together by a private line tab including the router 70ab in such a manner that they can carry out mutual communication, and are built in a certain area A. For example, the area A is Japan, the LAN 2a is built in Tokyo office, and the LAN 2b is built in the Osaka office.

On the other hand, the terminals (10ca, 10cb, 10cc, . . . ), the relay apparatuses 30c and the router 70c are connected together by a LAN 2c in such a manner that they can carry out mutual communication. The terminals (10da, 10db, 10dc, . . . ), the relay apparatuses 30d and the router 70d are connected together by a LAN 2d in such a manner that they can carry out mutual communication. The LAN 2c and the LAN 2d are connected together by a private line 2cd including the router 70cd in such a manner that they can carry out mutual communication, and are built in a certain area B. For example, the area B is the USA, the LAN 2c is built in the New York office, and the LAN 2d is built in the Washington, D.C. office. The area A and the area B are connected together in such a manner that they can carry out mutual communication by the Internet 2i via the routers (70ab and 70cd), respectively.

Further, the transmission management system 50 and the program providing system 90 are connected with the terminals 10 and the relay apparatuses 30 in such a manner that they can carry out mutual communication by the Internet 2i. The transmission management system 50 and the program providing system 90 may be installed in the area A or the area B, or may be installed in another area.

It is noted that in the first embodiment, the communication network 2 includes the LAN 2a, the LAN 2b, the private line 2ab, the Internet 2i, the private line 2cd, the LAN 2c and the LAN 2d. In the communication network 2, not only wired parts, but also wireless parts where communication is carried out wirelessly by WiFi (Wireless Fidelity), Bluetooth (registered trademark), or such, may be included.

Further, in FIG. 1, four sets of numerals below each of the terminals 10, the relay apparatuses 30, the transmission management system 50, the routers 70 and the program providing system 90 show an IP address according to the common IPv4 in a simplified manner. For example, the IP address of the terminal 10aa is "1.2.1.3". IPv6 may be used instead of IPv4. However, for the sake of simplifying the description, the description will be made using IPv4.

It is noted that the respective terminals 10 may be used not only for a telephone call between the plural offices or different rooms in a same office, but also for a telephone call within a same room, between an outdoor person and an indoor person or between an outdoor person and another outdoor person. In a case where the respective terminals 10 are used outdoors, communication may be carried out wirelessly by using a cell phone communication network or such.

<<Hardware Configuration of First Embodiment>>

Figure 4A:
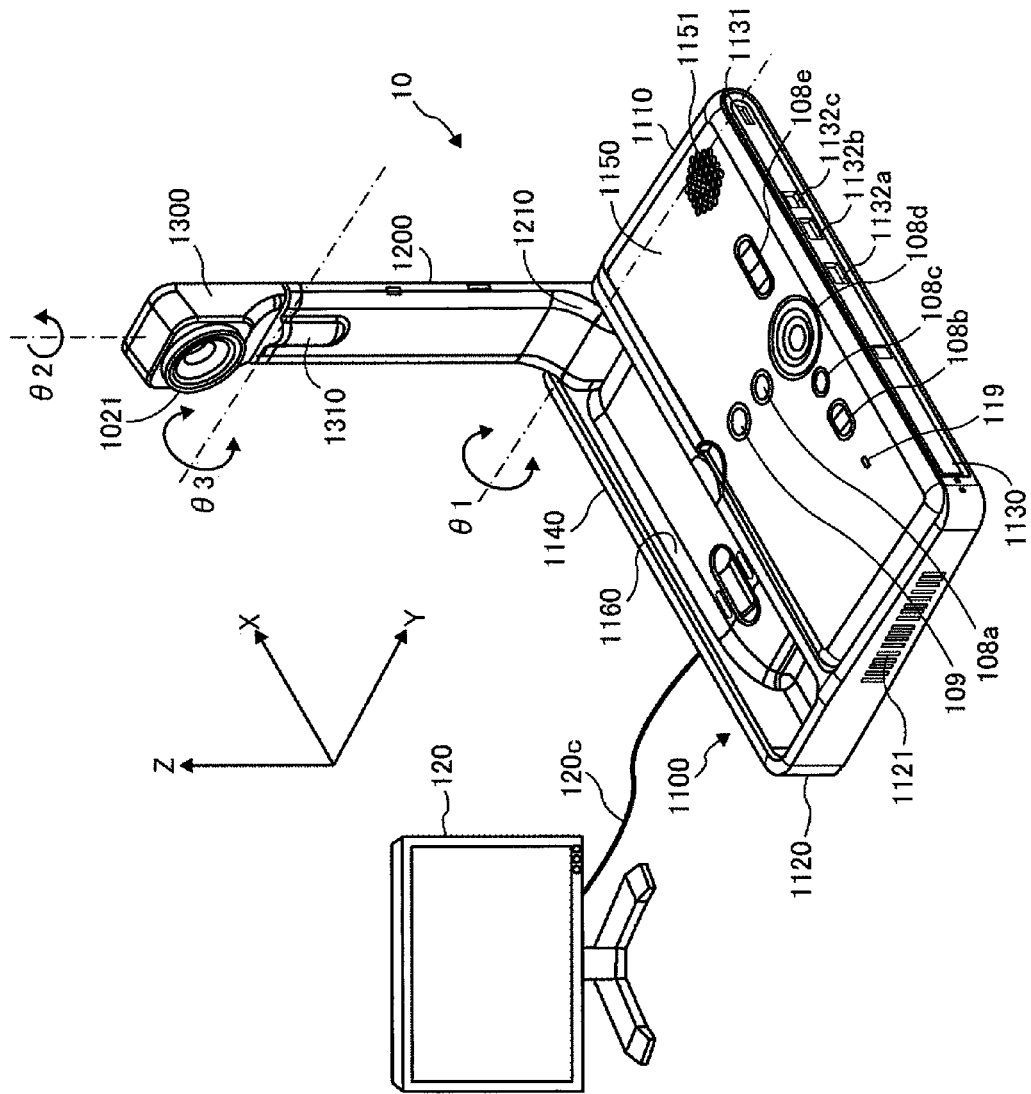
FIG. 4A shows an external appearance of one example of a transmission terminal according to the first embodiment.

First, a hardware configuration of the first embodiment will be described. FIG. 4A shows one example of an external appearance of the terminal 10 according to the first embodiment. Below, a longitudinal direction of the terminal 10 is referred to as an X-axis direction, a direction perpendicular to the X-axis direction on the horizontal plane is referred to as a Y-axis direction and a direction (vertical direction) perpendicular to the X-axis direction and the Y-axis direction is referred to as a Z-axis direction.

As shown in FIG. 4A, the terminal 10 includes a housing 1100, an arm 1200 and a camera housing 1300. On a rear side wall 1110 of the housing 1100, an air suction surface (not shown) including plural air suction holes is provided. On a front side wall 1120 of the housing 1100, an air discharge surface 1121 including plural air discharge holes is provided. Thereby, as a result of a cooling fan (not shown) provided in the inside of the housing 1100 being driven, air behind the terminal 10 is taken in via the air suction surface, and the air is discharged to the front side of the terminal 10 via the air discharge surface 1121. Ona right side wall 1130 of the housing 1100, a sound collecting hole 1131 is formed, and voice, sound, noise or such is collected by means of a microphone 114 (see FIG. 5, described later) provided in the inside of the housing 1100 described later.

On a top surface of the housing 1100 at an area near the right side wall 1130, an operations panel 1150 is provided. On the operations panel 1150, plural operating buttons (108a through 108e) described later, a power supply switch 109 described later and an alarm lamp 119 described later are provided. Also, on the operations panel 1150, a sound output surface 1151 including plural sound output holes formed for passing through output sound from a speaker 115 provided in the inside of the housing 1100 described later is provided. Further, on the top surface of the housing 1100 at an area near a left side wall 1140, a holding hole 1160 as a depression for receiving the arm 1200 and the camera housing 1300 is provided. On the right side wall 1130 of the housing 1100, plural connection holes (1132a through 1132c) are provided for electrically connecting cables to an external apparatus connecting I/F 118 described later. On the other hand, on the left side wall 1140 of the housing 1100, a connection hole (not shown) is provided for electrically connecting a cable 120c for a display device 120 to the external apparatus connecting I/F 118.

It is noted that hereinafter, in a case where any operating button of the operating buttons (108a through 108e) is referred to, this will be generally referred to as an "operating button 108". Similarly, in a case where any connection hole of the connection holes (1132a through 1132e) is generally referred to, this will be referred to as a "connection hole" 1132.

The arm 1200 is mounted on the housing 1100 via a torque hinge 1210, and is configured to be able to rotate vertically in a range of a tilt angle $\theta 1$ of 135° with respect to the housing 1100. FIG. 4A shows a state where the tilt angle $\theta 1$ is 90°.

A camera 112 is provided in the inside of the camera housing 1300, and the user, a document, a room and so forth can be photographed. Further, a torque hinge 1310 is formed in the camera housing 1300. The camera housing 1300 is mounted on the arm 1200 via the torque hinge 1310, and thus a configuration is provided such that the camera housing 1300 can be rotated vertically and horizontally, in a range of a pan angle $\theta 2$ of ±180° and in a range of a tilt angle $\theta 3$ of ±45°, where FIG. 4A shows a state of 0°.

Figure 4B:
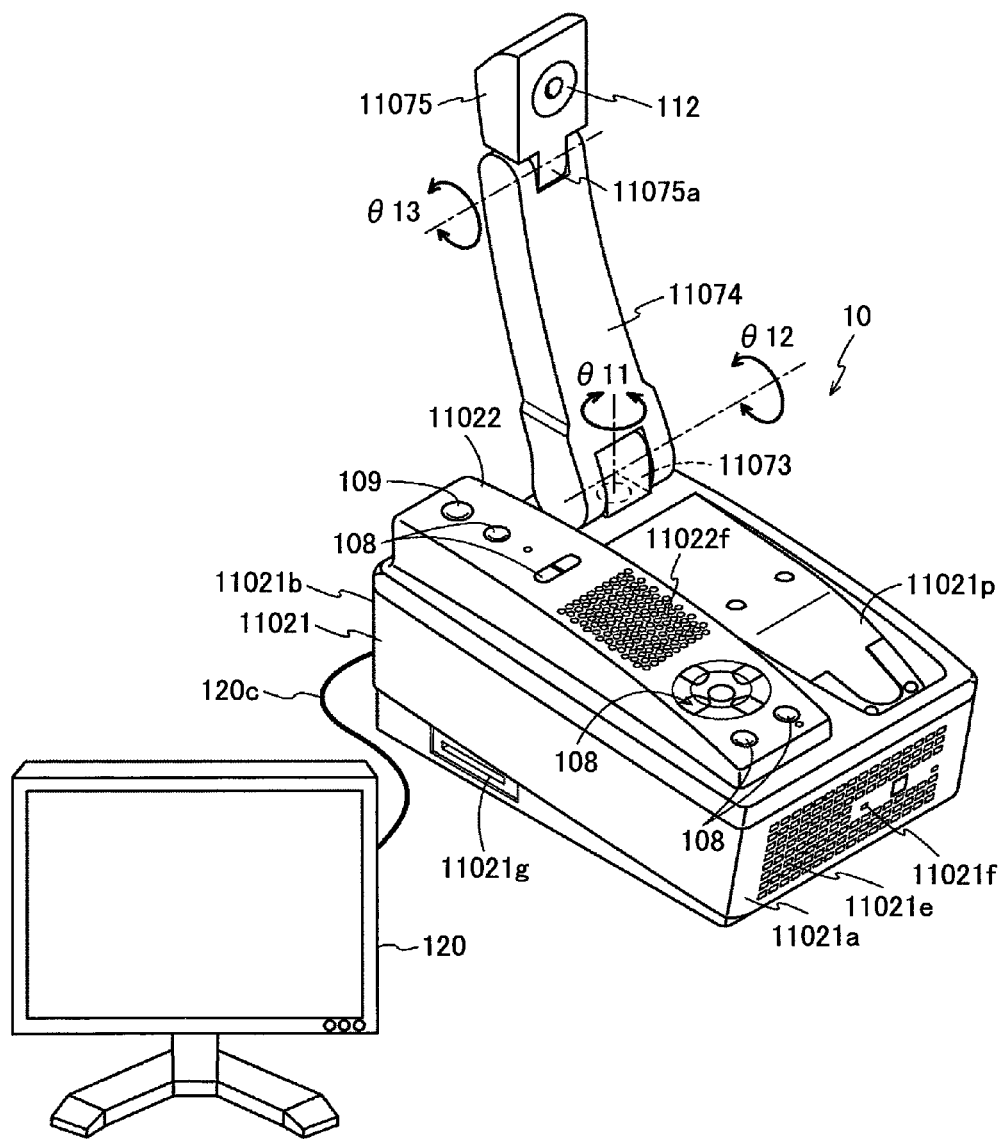
FIG. 4B shows an external appearance of another example of a transmission terminal according to the first embodiment.

FIG. 4B shows another example of an external appearance of the terminal 10. As shown in FIG. 4B, in this example, the terminal 10 includes a housing 11021, an arm 11074 and a camera housing 11075. On an approximately entire surface of a front side wall 11021a of the housing 11021, plural air suction holes 11021e are formed. On an approximately entire area of a rear side wall 11021b of the housing 11021, plural air discharge holes (now shown) are formed. Thereby, due to a cooling fan (not shown) provided in the inside of the housing 11021, air in front of the terminal 10 is suctioned via the air suction holes 11021e, and is discharged to the rear side of the terminal 10 via the air discharge holes. A sound collection hole 11021f is formed at a central part of the front side wall 11021a, and voice, sound, noise or such is collected by a microphone 114 in the inside of the housing 11021 via the sound collection hole 11021e. On a lower side surface of the housing 11021, a connection hole 11021g corresponding to a hardware I/F for connecting a cable terminal of an external apparatus (such as a camera, a microphone, a speaker or such provided in the outside of the terminal) is formed.

An operations panel 11022 is formed on the left side, viewed from the front side, on the housing 11021. On the operations panel 11022, operating buttons 108 and a power supply switch 109, described later, are provided, and also, plural sound output holes 11022f for passing therethrough output sound from a speaker 115 (described later) provided in the inside of the terminal 10 are provided. Further, at a right side area on the housing 11021, viewed from the front side, a holding part 11021p is formed as a depression for holding an arm 11074 and a camera housing 11075.

The arm 11074 is mounted on the housing 11021 via a torque hinge 11073. A configuration is provided whereby the arm 11074 is rotatable vertically and horizontally with respect to the housing 11021 in a range of a pan angle $\theta 11$ of ±180 degrees where the front direction is 0 degrees, and also, in a range of a tilt angle $\theta 12$ of 90 degrees (where a clicking feeling is provided at a time of inclination of approximately 45 degrees).

In the inside of the camera housing 11075, a camera 112 is provided, thereby, the user, a room and so forth can be photographed. Further, a torque hinge 11075a is provided in the camera housing 11075. The camera housing 11075 is mounted on the arm 11074 via the torque hinge 11075a. Then, a configuration is provided whereby when the angle where the camera housing 11075 is linear with respect to the arm 11075 is referred to as 0 degrees, the camera housing 11075 is rotatable in a range of a tilt angle $\theta 13$ of approximately 100 degrees to the front side of the terminal 10 and approximately 90 degrees to the rear side of the terminal 10.

It is noted that each of the relay apparatuses 30, the transmission management system 50, the program providing system 90 and the maintenance system 100 has an external appearance the same as that of a common server computer. Therefore, description of the external appearances thereof will be omitted.

FIG. 5 shows a hardware configuration of the terminal 10 according to the first embodiment. As shown in FIG. 5, the terminal 10 according to the first embodiment includes a CPU (Central Processing Unit) 101 controlling operations of the entirety of the terminal 10; a ROM (Read Only Memory) 102 storing programs such as an IPL (Initial Program Loader) to be used for driving the CPU 101; a RAM (Random Access Memory) 103 used as a work area of the CPU 101; and a flash memory 104 storing a program for the terminal 10 and various data such as image data and voice data. The terminal 10 according to the first embodiment further includes a SSD (Solid State Drive) 105 controlling reading and writing various data from and to the flash memory 104 according to the control of the CPU 101; a media drive 107 controlling reading and writing (recording) data from and to a recording medium 106 such as a flash memory; the operating buttons 108 operated by the user in a case where the user selects a destination of the terminal 10 and so forth; the power supply switch 109 for switching turning on/off of the power supply in the terminal 10; and a network I/F (InterFace) 111 for transmitting data using the communication network 2.

Further, the terminal 10 includes the camera 112 of a built-in type photographing an object and obtaining image data according to the control of the CPU 101; an image sensor I/F 113 controlling driving the camera 112; the microphone 114 of a built-in type inputting voice; the speaker 115 of a built-in type outputting voice; a voice input/output I/F 116 processing input and output of voice signals from the microphone 114 and to the speaker 115; and a display I/F 117 transmitting image data to the display device 120 provided in the outside according to the control of the CPU 101. The terminal 10 further includes the external apparatus connecting I/F 118 for connecting various types of external apparatuses inserted in the connection hole 1132 in FIG. 4A or the connection hole 11021g in FIG. 4B; the alarm lamp 119 (omitted in the example of FIG. 4B) reporting unusual conditions of various functions of the terminal 10; and a bus line 110 such as an address bus, a data bus and so forth for electrically connecting the above-mentioned various elements/components as shown in FIG. 5.

The display device 120 is a display part made of a liquid crystal, an organic electroluminescence (EL) material or such displaying an image of an object, operating icons, or such. Further, the display device 120 is connected with the display I/F 117 by the cable 120c. The cable 120c may be a cable for an analog RGB (VGA) signal, a cable for a component video signal, a cable for HDMI (High-Definition Multimedia Interface), a cable for DVI (Digital Video Interactive) signal, or such.

The camera 112 includes a lens and a solid state image sensor converting light into electric charge and obtaining a signal of an image (video) of an object. As the solid state image sensor, a CMOS (Complementary Metal Oxide Semiconductor) device, a CCD (Charge Coupled Device) or such may be used.

To the external apparatus connecting I/F 118, external apparatuses (not shown) such as a camera provided in the outside, a microphone provided in the outside, a speaker provided in the outside or such may be electrically connected by a USB (Universal Serial Bus) cable or such. In a case where the camera provided in the outside is connected, the cameral provided in the outside is driven with a higher priority than the camera 112 of the built-in type according to the control of the CPU 101. In a case where the microphone provided in the outside or the speaker provided in the outside is connected, the microphone provided in the outside or the speaker provided in the outside is driven with a higher priority than the microphone 114 of the built-in type or the speaker 115 of the built-in type according to the control of the CPU 101.

It is noted that the recording medium 106 is freely detachable from the terminal 10. Further instead of the flash memory 104, an EEPROM (Electrically Erasable and Programmable ROM) or such may be used as long as it is a non-volatile memory for reading and writing data according the control of the CPU 101.

The above-mentioned program for the terminal may be recorded in a computer readable recording medium (the recording medium 106 or such) in a form of a file of an installable type or an executable type, and be circulated. Further, the program for the terminal may be stored in the ROM 102 instead of the flash memory 104.

Figure 6:
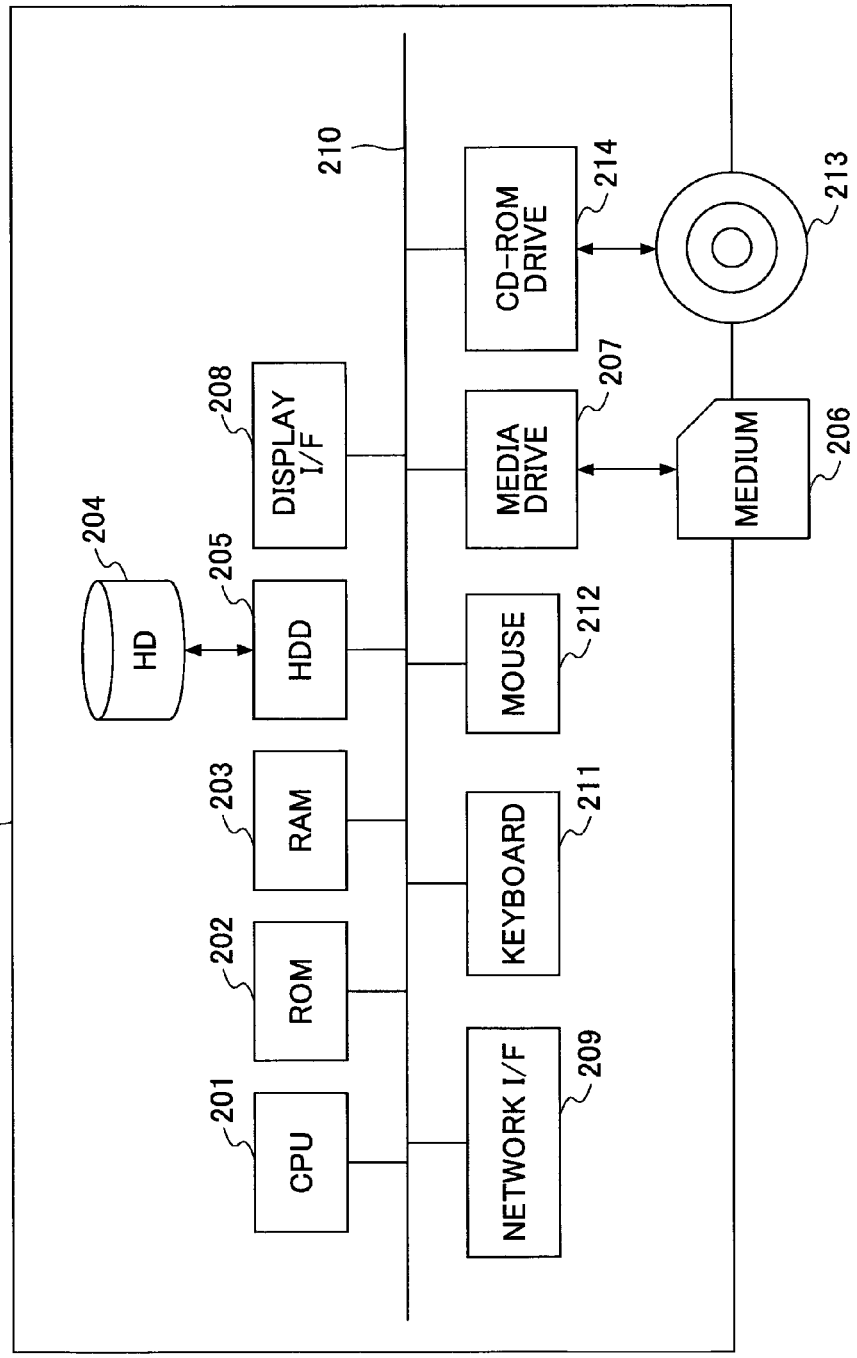
FIG. 6 shows a hardware configuration of each of a transmission management system, a relay apparatus, a program providing system and a maintenance system according to the first embodiment.

FIG. 6 shows a hardware configuration of the transmission management system 50 according to the first embodiment. The transmission management system 50 includes a CPU 201 controlling operations of the entirety of the transmission management system 50; a ROM 202 storing a program such as an IPL used for driving the CPU 201; a RAM 203 used as a work area of the CPU 201; a HD (hard disk) 204 storing various data such as the program for transmission management; an HDD (Hard Disk Drive) 205 controlling reading and writing of the various data from and to the HD 204 according to the control of the CPU 201; a media drive 207 controlling reading and writing (recording) of data from and to a recording medium 206 such as a flash memory; and a display device 208 displaying various sorts of information such as a cursor, a menu, a window, characters/letters (text) or images. The transmission management system 50 further includes a network I/F 209 for carrying out data transmission using the communication network 2; a keyboard 211 including plural keys for the user to input characters/letters, numerical values, various instructions and so forth; a mouse 212 for the user to select or execute various instructions, select a target to process, move the cursor or so; a CD-ROM drive 214 controlling reading various data from a CD-ROM (Compact Disc Read Only Memory) 213 as an example of a detachable recording medium; and a bus line 210 such as an address bus, a data bus and so forth electrically connecting the above-mentioned respective elements/components together as shown in FIG. 6.

It is noted that the program for transmission management may be recorded in a computer readable recording medium such as the above-mentioned recording medium 206, CD-ROM 213 or such in a form of a file of an installable type or an executable type, and be circulated. Further, the program for transmission management may be recorded in the ROM 202 instead of the HD 204.

Further, the relay apparatus 30 has the same hardware configuration as that of the transmission management system 50, and therefore, the description thereof will be omitted. However, in the HD 204 of the relay apparatus 30, a program for the relay apparatus for controlling the relay apparatus 30 is recorded. Also in this case, the program for the relay apparatus may be recorded in a computer readable recording medium such as the recording medium 206, the CD-ROM 213 or such in a form of a file of an installable type or an executable type, and be circulated. Further, the program for the relay apparatus may be stored in the ROM 202 of the relay apparatus 30 instead of the HD 204 of the relay apparatus 30.

Further, each of the program providing system 90 and the maintenance system 100 has the same hardware configuration as that of the transmission management system 50, and therefore, the description thereof will be omitted. However, in the HD 204 of the program providing system 90, a program for controlling the program providing system 90 is recorded. Also in this case, the program for controlling the program providing system 90 may be recorded in a computer readable recording medium such as the recording medium 206 or the CD-ROM 213 in a form of a file of an installable type or an executable type, and be circulated. Further, the program for controlling the program providing system 90 may be stored in the ROM 202 instead of the HD 204.

It is noted that each of the above-mentioned programs may be recorded in a computer readable recording medium such as a CD-R (Compact Disc Recordable), a DVD (Digital Versatile Disk) or a Blu-ray Disc, as another example of the above-mentioned detachable recording medium, and be provided.

<<Functional Configuration of First Embodiment>>

Figure 7:
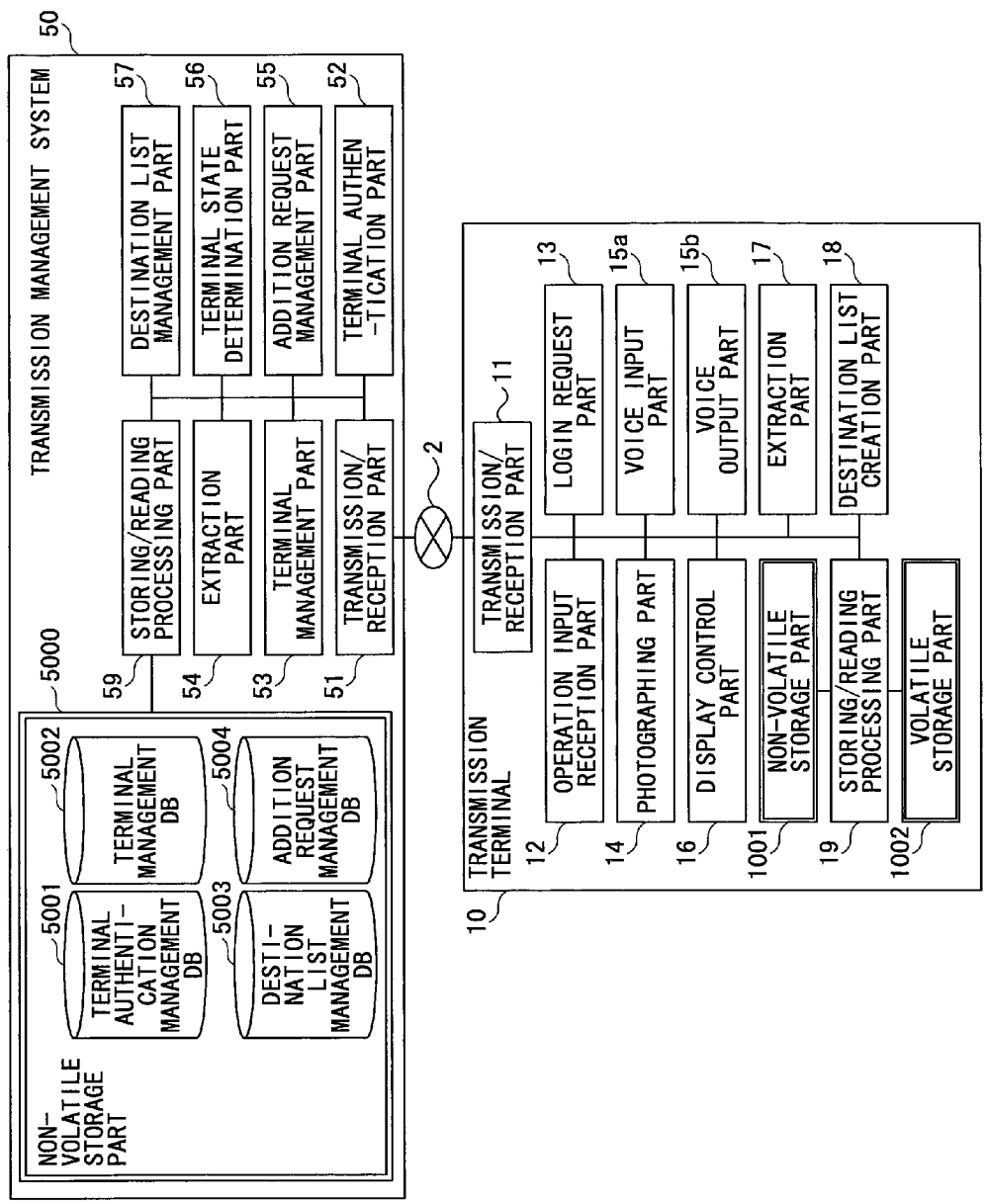
FIG. 7 is a functional block diagram of the transmission terminal and the transmission management system included in the transmission system according to the first embodiment.

Next, a functional configuration of the first embodiment will be described. FIG. 7 shows a functional block diagram of the terminal 10 and the transmission management system 50 included in the transmission system 1 according to the first embodiment. In FIG. 7, the terminal 10 and the transmission management system 50 are connected together by the communication network 2 in such a manner that data transmission can be mutually carried out. Further, the program providing system 90 shown in FIG. 1 is omitted in FIG. 7 because the program providing system 90 does not directly relate to communication for a TV conference.

<Functional Configuration of Terminal>

The terminal 10 includes a transmission/reception part 11, an operation input reception part 12, a login request part 13, a photographing part 14, a voice input part 15a, a voice output part 15b, a display control part 16, an extraction part 17, a destination list creation part 18 and a storing/reading processing part 19. The respective parts correspond to functions or functioning parts realized as a result of the respective ones of elements/components shown in FIG. 5 operating according to instructions given by the CPU 101 that operates according to the program for the terminal developed on the RAM 103 from the flash memory 104.

Further, the terminal 10 has a volatile storage part 1002 provided by the RAM 103 shown in FIG. 5 and a non-volatile storage part 1001 provided by the flash memory 104.

(Detailed Functional Configuration of Terminal)

With reference to FIGS. 5 and 7, the functional configuration of each of the parts of the terminal 10 will be described in detail. Further, below, along with describing the respective functional configurations of the parts of the terminal 10, relationships with main elements/components, from among those shown in FIG. 5, used for realizing the respective functional configurations of the parts of the terminal 10 will be also described.

The transmission/reception part 11 of the terminal 10 is realized by instructions from the CPU 101 shown in FIG. 5 and the network I/F 111 shown in FIG. 5, and carries out transmission and reception of various sorts of data (or information) with another terminal, apparatus or system via the communication network 2. The transmission/reception part 11 starts reception of respective state information indicating states of respective terminals as candidates for a destination from the transmission management system 50 before starting a telephone call with the desired destination terminal. It is noted that the state information indicates not only an operating state (on-line or off-line) of each terminal but also a detailed state of whether on telephone call further when on-line, whether the user is leaving his or her seat, or so. Further, the state information indicates various states including not only the operating state of each terminal but also whether the cable 120c has been removed from the terminal 10, whether the terminal 10 has been set to output voice but not output an image, or output no voice (MUTE), and so forth.

The operation input reception part 12 is realized by instructions from the CPU 101 shown in FIG. 5 and the operating buttons 108 and the power supply switch 109, and receives various sorts of input operations carried out by the user. For example, when the user turns on the power supply switch 109, the operation input reception part 12 shown in FIG. 7 turns on the power supply in the terminal 10 by receiving the user's operation of turning on the power supply switch 109.

The login request part 13 is realized by instructions from the CPU 101, and automatically transmits login request information indicating to request login and an IP address of the requested terminal at the current time to the transmission management system 50 via the communication network 2 from the transmission/reception part 11 in response to receiving the user's operation of turning on the power supply switch 109. Further, when the user turns off the power supply switch 109, the transmission/reception part 11 transmits the state information to turn off the power supply to the transmission management system 50, and after that, the operation input reception part 12 completely turns off the power supply in the terminal 10. Thus, the transmission management system 50 can understand that the terminal 10 is changing its state from the power turned on (power supply ON) to the power turned off (power supply OFF).

The photographing part 14 is realized by instructions from the CPU 101, and the camera 112 and the image sensor I/F 113 shown in FIG. 5, and photographs an object and outputs image data thus obtained from the photographing.

The voice input part 15a is realized by instructions from the CPU 101 and the voice input/output I/F 116 shown in FIG. 5, and inputs voice data expressed by a voice signal when a voice of the user is converted into the voice signal by the microphone 114. The voice output part 15b is realized by instructions from the CPU 101 and the voice input/output I/F 116, and outputs a voice signal expressing voice data to the speaker 115 and causes the speaker 115 to output a voice.

The display control part 16 is realized by instructions from the CPU 101 and the display I/F 117 shown in FIG. 5, and carries out control to transmit image data to the display device 120 provided in the outside.

The extraction part 17 is realized by instructions from the CPU 101, and extracts various sorts of data (or information) from a volatile storage part 1002.

Figure 13:
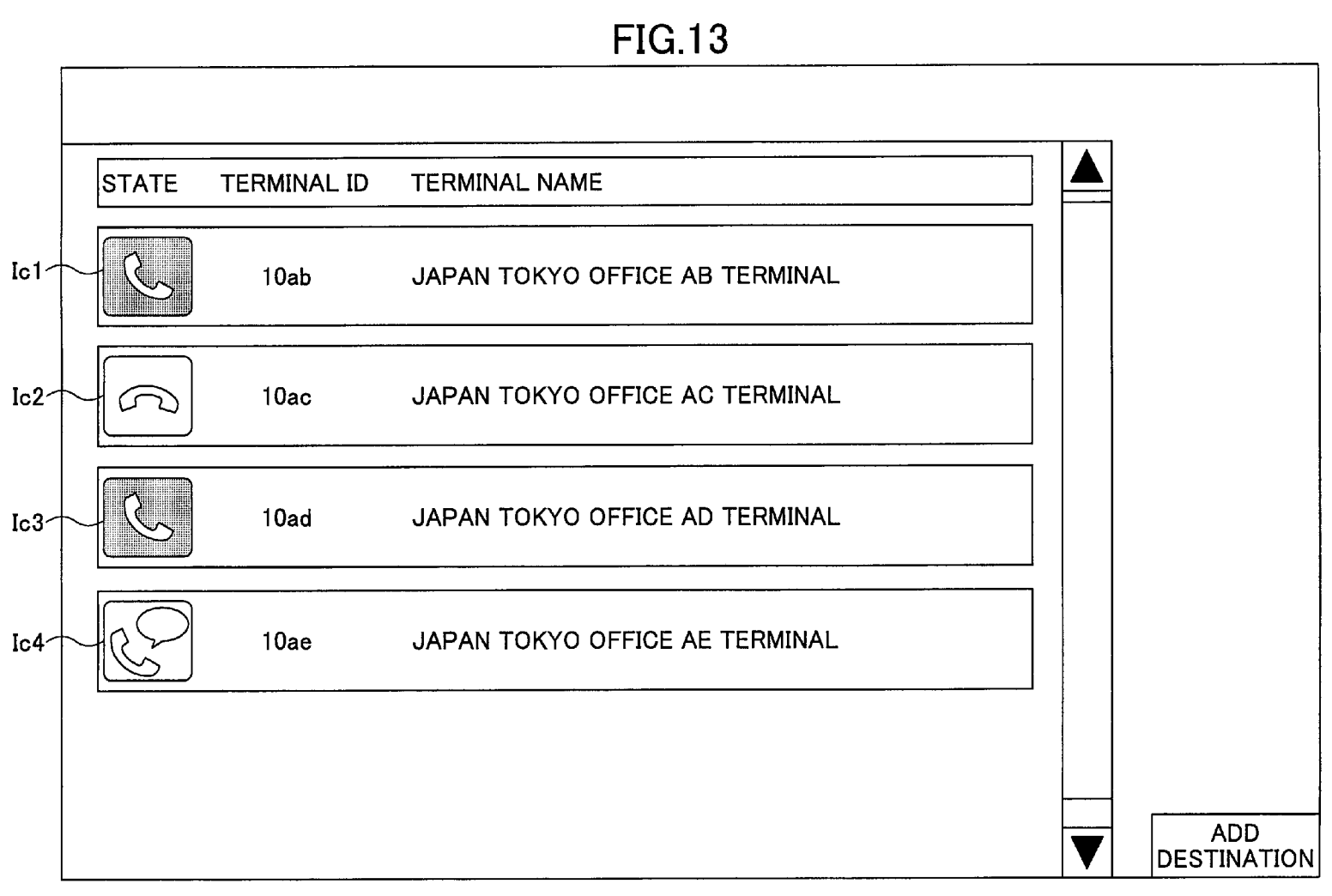

The destination list creation part 18 creates and updates a destination list where, as shown in FIG. 13, states of destination candidates are indicated by icons, based on destination list information and state information of terminals 10 as destination candidates received from the transmission management system 50.

The storing/reading processing part 19 is realized by instructions from the CPU 101 and the SSD 105 shown in FIG. 5, stores various sorts of data in a non-volatile storage part 1001, and reads various sorts of data stored in the non-volatile storage part 1001. In the non-volatile storage part 1001, terminal IDs (identifications) as examples of identification information for identifying the terminals 10, respectively, passwords and so forth, are stored. Further, the storing/reading processing part 19 also stores various sorts of data in the volatile storage part 1002, and reads various sorts of data stored in the volatile storage part 1002. In the volatile storage part 1002, image data and voice data received when a telephone call is carried out with a destination terminal 10 are stored in an overwriting manner each time of receiving. There, an image is displayed on the display device 120 from the image data before being overwritten, and voice audio is output from the speaker 115 from the voice data before being overwritten.

It is noted that the terminal IDs and relay apparatus IDs described later according to the first embodiment indicate identification information such as a language, a character/letter, a sign or various sorts of marks used for uniquely identifying the respective terminals 10 and relay apparatuses 30. Further, each of the terminal IDs and the relay apparatus IDs may be identification information that is a combination of at least two of the above-mentioned language, character/letter, sign and various sorts of marks.

<Functional Configuration of Transmission Management System>

The transmission management system 50 includes a transmission/reception part 51, a terminal authentication part 52, a terminal management part 53, an extraction part 54, an addition request management part 55, a terminal state determination part 56, a destination list management part 57, a storing/reading processing part 59 and a delay time management part 60. These respective parts correspond to functions or functioning parts realized as a result of the respective elements/components shown in FIG. 6 operating according to instructions given by the CPU 201 that operates according to the program for transmission management loaded in the RAM 203 from the HD 204. Further, the transmission management system 50 has a non-volatile storage part 5000 where various sorts of data (or information) are maintained even after the power supply in the transmission management system 50 is turned off. The non-volatile storage part 5000 comprises the HD 204 shown in FIG. 6. Further, in the non-volatile storage part 5000, data of a destination list frame shown in FIG. 13 (i.e., data of a destination list frame shown in FIG. 13, not including icons indicating specific operating states, terminal IDs and terminal names) is stored.

(Terminal Authentication Management Table)

Further, in the non-volatile storage part 5000, a terminal authentication management DB 5001 including a terminal authentication management table such as that shown in FIG. 8 is stored. In the terminal authentication management table, respective passwords are associated with the terminal IDs of the terminals 10 managed by the transmission management system 50 and are managed. For example, in the terminal authentication management table shown in FIG. 8, it is indicated that the terminal ID of the terminal 10aa is "01aa", and the password is "aaaa".

(Terminal Management Table)

Further, in the non-volatile storage part 5000, a terminal management DB 5002 including the terminal management table such as that shown in FIG. 9 is stored. In the terminal management table, for the terminal ID of each of the terminals 10, a destination name (i.e., terminal name) for a case where the terminal 10 acts as a destination, the operating state of the terminal 10, the reception date and time when login request information (described later) has been received by the transmission management system 50, and the IP address of the terminal 10 are associated with each other and are managed. For example, in the terminal management table shown in FIG. 9, it is indicated that the terminal 10aa having the terminal ID "01aa" has the destination name "JAPAN TOKYO OFFICE AA TERMINAL", the operating state "on-line (transmission possible)", the reception date and time when the login request information has been received in the transmission management system 50 is "Nov. 10, 2009, 13:40", and the IP address of the terminal 10aa is "1.2.1.3".

(Destination List Management Table)

Further, in the non-volatile storage part 5000, a destination list management DB 5003 including the destination list management table such as that shown in FIG. 10 is stored. In the destination list management table, for the terminal ID of a request source terminal which requests to start a telephone call in a TV conference, all of the terminal IDs of the destination terminals registered as candidates for a destination terminal are associated and are managed. For example, in the destination list management table shown in FIG. 10, it is indicated that the candidates for a destination terminal for which the request source terminal (terminal 10aa) can request to start a telephone call in a TV conference are the terminal 10ab having the terminal ID "01ab", the terminal 10ba having the terminal ID "01ba", the terminal 10bb having the terminal ID "01bb" and so forth. The candidates for a destination terminal are updated as a result of addition or deletion according to a request of addition or deletion from any request source terminal to the transmission management system 50.

Further, in the destination list management table (the destination list management DB 5003, see FIG. 10), not only the terminal IDs of the destination terminals registered as candidates for a destination terminal, but also the destination names managed in the terminal management table (the terminal management DB 5002, see FIG. 9) for the respective terminal IDs may be managed as being associated with the respective terminal IDs.

(Addition Request Management Table)

Further, in the non-volatile storage part 5000, an addition request management DB 5004 including an addition request management table such as that shown in FIG. 11 is stored. In the addition request management table, a terminal ID of a terminal (hereinafter, referred to as "request source terminal" the same as the above-described start request source terminal for a telephone call) having requested to add a destination candidate and a terminal ID of a terminal which is thus requested to be the destination candidate (hereinafter, referred to as "request target terminal") are associated with one another and managed. Thereby, it is possible to manage which terminal has requested to add which terminal as a destination terminal. It is noted that the destination list management table and the addition request management table have the terminal IDs of the request source terminals common therebetween, and therefore, it is possible to integrate these two tables into a single table.

(Detailed Functional Configuration of Transmission Management System)

Next, the functional configuration of each of the parts included in the transmission management system 50 will be described in detail. It is noted that below along with describing the respective functional configurations of the parts of the transmission management system 50, relationships with main elements/components, from among those shown in FIG. 6, used for realizing the respective functional configurations of the parts of the transmission management system 50 will be also described.

The transmission/reception part 51 shown in FIG. 7 is realized by instructions from the CPU 201 shown in FIG. 6 and the network I/F 209 shown in FIG. 6, and carries out transmission and reception of various sorts of data (information) with another set of equipment such as a terminal 10, a relay apparatus 30 or a system 90 or 100 via the communication network 2.

The terminal authentication part 52 is realized by instructions from the CPU 201, searches the terminal authentication management DB 5001 in the non-volatile storage part 5000 using the terminal ID and the password included in the login request information received via the transmission/reception part 51 as search keys, and carries out authentication of the terminal 10 by determining whether the same set of the terminal ID and password is managed in the terminal authentication management DB 5001.

The terminal management part 53 is realized by instructions from the CPU 201, and for the purpose of managing the operating state of a request source terminal which has requested to login, stores the terminal ID of the request source terminal, the operating state of the request source terminal, the reception date and time when the login request information has been received in the transmission management system 50 and the IP address of the request source terminal in the terminal management DB 5002 (see FIG. 9) in a manner of associating them with each other and manages them. Further, the terminal management part 53 changes the operating state indicating on-line in the terminal management DB 5002 (see FIG. 9) into off-line based on the state information indicating that power supply will be turned off sent from a terminal 10 in response to the user of the terminal 10 turning off the power supply switch 109 of the terminal 10.

The extraction part 54 is realized by instructions from the CPU 201 shown in FIG. 6, searches the destination list management DB 5003 (see FIG. 10) using the terminal ID of a request source terminal which has requested to login as a search key, reads the terminal IDs of candidates for a destination terminal which can carry out a telephone call with the request source terminal, and extracts the terminal IDs. Further, the extraction part 54 searches the destination list management DB 5003 (see FIG. 10) using the terminal ID of a request source terminal which has requested to login as a search key, and extracts also the terminal IDs of the other request source terminals which have registered the terminal ID of the request source terminal as a candidate for a destination terminal. Further, the extraction part 54 searches the terminal management DB 5002 (see FIG. 9) using the terminal IDs of candidates for a destination terminal thus extracted by the extraction part 54 as search keys, and reads the operating state for each of the terminal IDs thus extracted by the extraction part 54. Thereby, the extraction part 54 can obtain the operating states of the candidates for a destination terminal which can carry out a telephone call with the request source terminal having requested to login. Further, the extraction part 54 searches the terminal management DB 5002 (see FIG. 9) using the terminal ID of the request source terminal having requested to login, and obtains the operating state of the request source terminal having requested to login.

The addition request management part 55 is realized by instructions given by the CPU 201 shown in FIG. 6, newly stores the terminal ID of the request source terminal and the terminal ID of the request target terminal in the addition request management DB 5004 (see FIG. 11) for each of the records, and manages them. Further, the addition request management part 55 deletes the terminal ID of the request source terminal and the terminal ID of the request target terminal in the addition request management DB 5004 (see FIG. 11) for each of the records.

The terminal state determination part 56 is realized by instructions given by the CPU 201 shown in FIG. 6, searches the terminal management DB 5002 (see FIG. 9) using a terminal ID or a destination name as a search key, and determines the corresponding operating state.

The destination list management part 57 is realized by instructions given by the CPU 201 shown in FIG. 6, and adds or deletes the terminal ID of a destination terminal for each of the terminal IDs in the destination list management DB 5003 (see FIG. 10). Further, the destination list management part 57 manages, for the terminal ID of the request source terminal in the destination list management DB 5003 (see FIG. 10) the same as the terminal ID of the request source terminal managed in the addition request management DB 5004 (see FIG. 11), the terminal ID of the request target terminal managed in association with the terminal ID of the request source terminal in the addition request management DB 5004 (see FIG. 11), as a terminal ID of a destination terminal additionally in a manner of associating them.

The storing/reading processing part 59 is realized by instructions from the CPU 201 and by the HDD 205 shown in FIG. 6, stores various sorts of data in the non-volatile storage part 5000 and reads various sorts of data stored in the non-volatile storage part 5000.

<<Processing/Operations of First Embodiment>>

Figure 12:
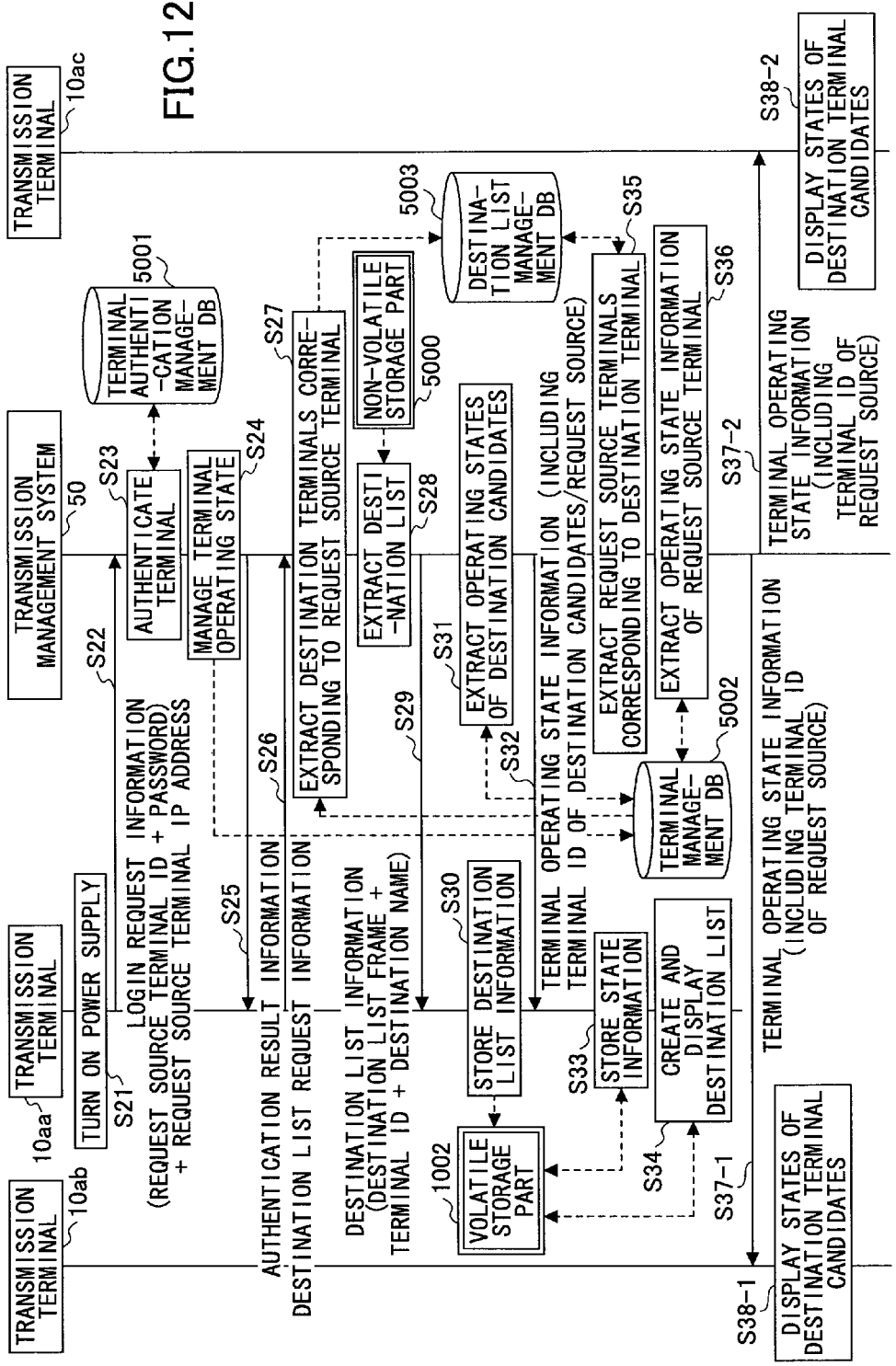
FIG. 12 is a sequence diagram showing a process in a preparation step for starting a telephone call between transmission terminals.

Next, with reference to FIGS. 12 through 18, processes carried out in the first embodiment will be described. First, with reference to FIGS. 12 and 13, a process of transmission/reception of various sorts of management information at a preparation stage before starting a telephone call between the terminal 10aa and the terminal 10db will be described. FIG. 12 is a sequence diagram showing a process of a preparation step for starting a telephone call between the terminals. FIG. 13 shows a concept of the destination list. It is noted that in FIG. 12, various sorts of management information are transmitted and received by the management information session "sei" shown in FIG. 2.

First, when the user turns on the power supply switch 109 shown in FIG. 5, the operation input reception part 12 shown in FIG. 7 receives the power supply turning on operation, and turns on the power supply in the terminal 10aa (step S21). Then, in response to the reception of the power supply turning on operation, the login request part 13 automatically transmits login request information indicating a login request to the transmission management system 50 via the communication network 2 from the transmission/reception part 11 (step S22). The login request information includes the terminal ID for identifying the own terminal (terminal 10aa) as the request source and the password. The terminal ID and password are data having been read out from the non-volatile storage part 1001 via the storing/reading processing part 19 and having been sent to the transmission/reception processing part 11. It is noted that when the login request information is transmitted to the transmission management system 50 from the terminal 10aa, the transmission management system 50 that has received the login request information can obtain the IP address of the terminal 10aa that has sent the login request information.

Next, the terminal authentication part 52 in the transmission management system 50 searches the terminal authentication management DB 5001 (see FIG. 8) of the non-volatile storage part 5000 using the terminal ID and the password included in the login request information having been received from the transmission/reception part 51 as search keys, determines whether the same terminal ID and password are managed in the terminal authentication management DB 5001, and thus, carries out authentication of the terminal 10aa by determining whether the same terminal ID and password are managed (step S23). In a case where it has been determined by the terminal authentication part 52 that the login request is one sent from the terminal 10aa having proper use authority since the same terminal ID and password are managed, the state management part 53 stores, for the record indicated by the terminal ID and the destination name of the terminal 10aa, the operating state thereof, the reception date and time when the above-mentioned login request information has been received, and the IP address of the terminal 10aa in the terminal management DB 5002 (see FIG. 9) in a manner of associating them with each other (step S24). Thereby, in the terminal management table shown in FIG. 9, the operating state "on-line", the reception date and time "2009.11.10.13:40" and the IP address "1.2.1.3" are associated with the terminal ID "01aa" and are managed.

Then, the transmission/reception part 51 of the transmission management system 50 transmits authentication result information indicating the result of the authentication obtained by the terminal authentication part 52 to the request source terminal (terminal 10aa), having carried out the above-mentioned login request, via the communication network 2 (step S25). Below, description will be carried out continuously supposing a case where the terminal authentication part 52 has determined that the terminal having carried out the above-mentioned login request has the proper use authority.

When receiving the authentication result information indicating the result of being determined as having the proper use authority, the transmission/reception part 11 of the request source terminal (terminal 10aa) transmits destination list request information requesting a destination list to the transmission management system 50 via the communication network 2 (step S26). Thereby, the transmission/reception part 51 of the transmission management system 50 receives the destination list request information.

Next, the extraction part 54 of the transmission management system 50 searches the destination list management DB 5003 (see FIG. 10) using the terminal ID "01aa" of the request source terminal (terminal 10aa) having carried out the login request as a search key, and extracts the terminal IDs of candidates for a destination terminal which can carryout a telephone call with the request source terminal (terminal 10aa), and also reads the destination names corresponding to the terminal IDs from the terminal management DB 5002 (see FIG. 9) (step S27). In this regard, in the case where not only the terminal IDs but also the destination names associated with the respective terminal IDs are managed in the destination list management table (the destination list management DB 5003 (see FIG. 10)) as mentioned above, the destination names corresponding to the terminal IDs may be read from the destination list management table (the destination list management DB 5003) instead of the terminal management table (the terminal management DB 5002 (see FIG. 9)) in step S27. Here, the terminal IDs ("01ab", "01ba", "01bb", ...) of destination terminals (terminals 10*ab*, 10*ba*, 10*bb*, . . . ) corresponding to the terminal ID "01*aa*" of the request source terminal (terminal 10*aa*), and further, the terminal names corresponding thereto ("Japan Tokyo office AB terminal", "Japan Osaka office BA terminal", "Japan Osaka office BB terminal", . . . ) are extracted.

Next, the transmission/reception part 51 of the transmission management system 50 reads the data of the destination list frame from the storage part 6000 via the storing/reading processing part 59 (step S28), and also, transmits "destination list information (destination list frame, terminal IDs and destination names)" including the destination list frame, the terminal IDs and the destination names thus extracted by the extraction part 54 to the request source terminal (terminal 10*aa*) (step S29). Thereby, in the request source terminal (terminal 10*aa*), the transmission/reception part 11 receives the destination list information, and the storing/reading processing part 19 stores the destination list information in the volatile storage part 1002 (step S30).

Thus, according to the first embodiment, the terminals 10 do not manage the destination list information but the transmission management system 50 manages the destination list information for all the terminals 10 in a unifying manner. Thereby, even in a case where a new terminal 10 comes to be included in the transmission system, in a case where a terminal 10 of a new type comes to be included instead of an existing terminal 10 or in a case where the appearance or such of the destination list frame is to be changed, the transmission management system 50 deals with the matter, and thus, it is possible to eliminate the work of changing the destination list to be carried out by the terminals 10.

Further, the extraction part 54 in the transmission management system 50 searches the terminal management DB 5002 (see FIG. 9) using the terminal IDs ("01*ab*", "01*ba*", "01*bb*", . . . ) of the candidates for a destination terminal extracted by the extraction part 54 as search keys, reads the respective operating states corresponding to the above-mentioned respective terminal IDs extracted by the extraction part 54, and obtains the respective operating states of the terminals (10*ab*, 10*ba*, 10*bb*, . . . ) as the destination candidates (step S31).

Next, the transmission/reception part 51 transmits a set of "terminal operating state information" including the terminal ID "01*ab*" extracted as one of the candidates for a destination terminal by the extraction part 54 in step S27 and the operating state "on-line (telephone call possible)" of the corresponding destination terminal (terminal 10*ab*) to the request source terminal (terminal 10*aa*) via the communication network 2 (step S32). Further, also in step S32, the transmission/reception part 51 transmits another set of "terminal operating state information" including the terminal ID "01*ba*" extracted as another of the candidates for a destination terminal by the extraction part 54 in step S27 and the operating state "on-line (temporarily interrupted)" of the corresponding destination terminal (terminal 10*ba*) to the request source terminal (terminal 10*aa*) via the communication network 2. In the same way, in step S32, the transmission/reception part 51 transmits respective sets of "terminal operating state information" for all of the remaining terminals extracted as the candidates for a destination terminal by the extraction part 54 in step S27 to the request source terminal (terminal 10*aa*) via the communication network 2, separately.

Next, the storing/reading processing part 19 in the request source terminal (terminal 10*aa*) stores the respective sets of the terminal operating state information received from the transmission management system 50 in the volatile storage part 1002, in sequence (step S33). Thereby, the request source terminal (terminal 10*aa*) can obtain the respective operating states of the respective terminals 10*ab*, . . . at the current time which are the candidates for a destination terminal which can carry out a telephone call with the request source terminal (terminal 10*aa*).

Next, the destination list creation part 18 of the request source terminal (terminal 10*aa*) creates a destination list on which the states of the terminals 10 as the destination candidates are reflected based on the destination list information and the terminal operating state information stored in the volatile storage part 1002. Further, the display control part 16 controls timing of displaying the destination list on the display device 120 shown in FIG. 5 (step S34). It is noted in the destination list shown in FIG. 13, icons Ic1, Ic2, Ic3 and Ic4 represent the respective operating states of the terminals, i.e., from the top, "on-line (transmission possible)" (Ic1), "off-line" (Ic2), "on-line (transmission possible)" (Ic3) and "on-line (on telephone call)" (Ic4). In a TV conference according to the first embodiment, "transmission possible" means "telephone call possible".

On the other hand, the extraction part 54 of the transmission management system 50 searches the destination list management DB 5003 (see FIG. 10) using the terminal ID "01*aa*" of the request source terminal (terminal 10*aa*) having carried out the login request as a search key, and extracts the terminal IDs of the other request source terminals which have registered the above-mentioned request source terminal (terminal 10*aa*) as a candidate for a destination terminal (step S35). In the destination list table shown in FIG. 10, the terminal IDs of the other request source terminals to be extracted are "01*ab*", "01*ba*" and "01*db*".

Next, the extraction part 54 of the transmission management system 50 searches the terminal management DB 5002 (see FIG. 9) using the terminal ID "01*aa*" of the request source terminal (terminal 10*aa*) having carried out the above-mentioned login request, and obtains the operating state of the request source terminal (terminal 10*aa*) having carried out the login request (step S36).

Next, the transmission/reception part 51 transmits "terminal state information" including the terminal ID "01*aa*" of the request source terminal (terminal 10*aa*) and the operating state "on-line" obtained in step S36 to the terminals 10*ba* and 10*db* which have the operating state of "on-line" in the terminal management DB 5002 (see FIG. 9) among the terminals 10*ab*, 10*ba* and 10*db* having the terminal IDs 01*ab*, 01*ba* and 01*db* extracted in step S35 (step S37-1, S37-2). It is noted that when the transmission/reception part 51 is to transmit the terminal state information to the terminals 10*ba* and 10*db*, the transmission/reception part 51 reads the IP addresses of these terminals managed in the terminal management table shown in FIG. 9 based on the respective terminal IDs ("01*ba*" and "01*db*"). Thereby, it is possible to inform the respective destination terminals (terminals 10*ba* and 10*db*) which can carry out a telephone call with the request source terminal (terminal 10*aa*) having carried out the login request as the destination, of the terminal ID "01*aa*", and the operating state "on-line" of the request source terminal (terminal 10*aa*) having carried out the above-mentioned login request.

On the other hand, also at each of the other terminals 10, the same as the above-mentioned step S21, when the user turns on the power supply switch 109 shown in FIG. 6, the operation input reception part 12 shown in FIG. 7 receives the power supply turning on operation, and the processes the same as those of steps S22 through S38-1 and S38-2 mentioned above are carried out. Therefore, the description therefor will be omitted.

Figure 14:
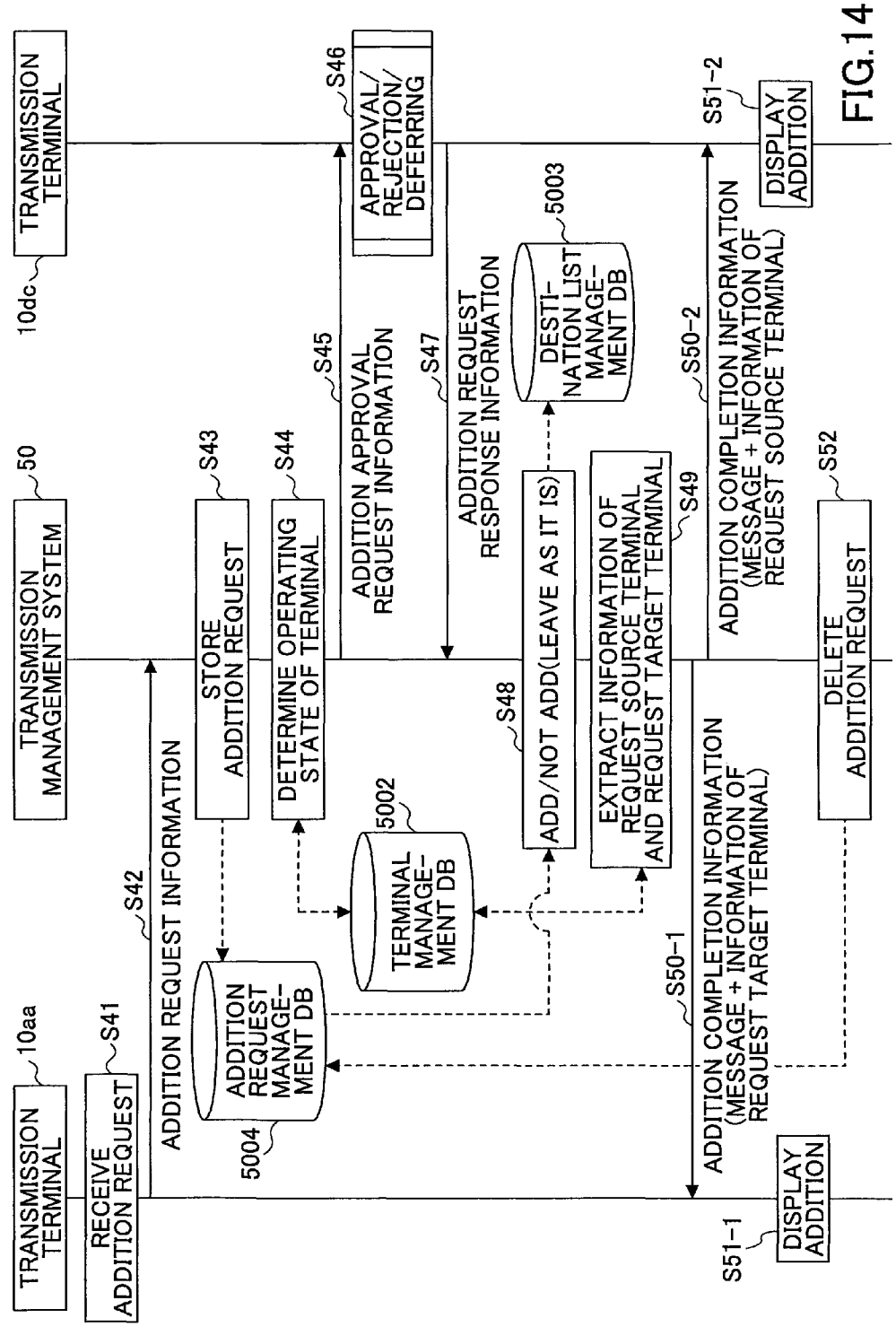
FIG. 14 is a sequence diagram showing a process of adding a destination candidate.
Figure 15:
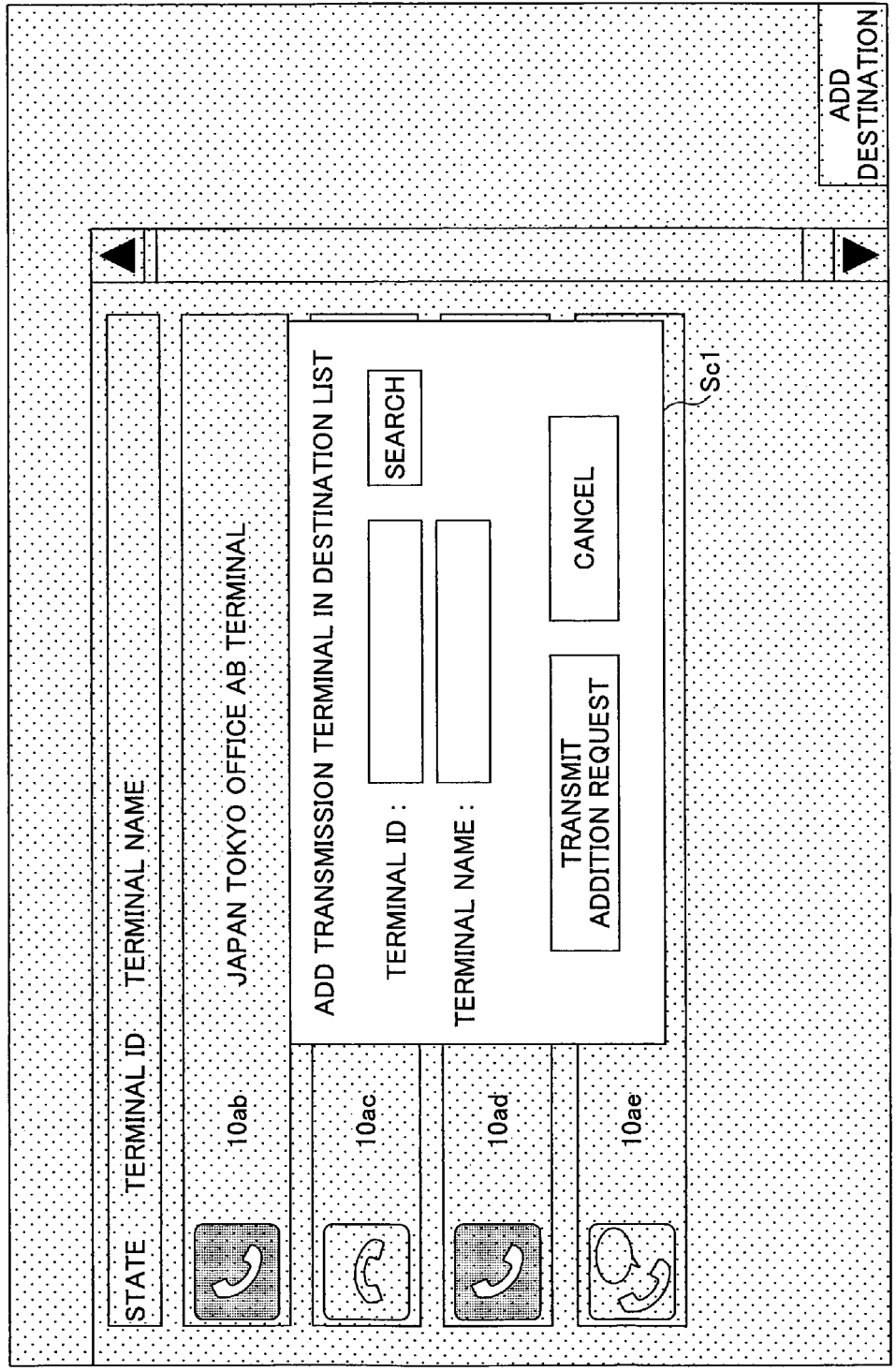
FIG. 15 shows a concept of an addition request reception screen page.
Figure 16:
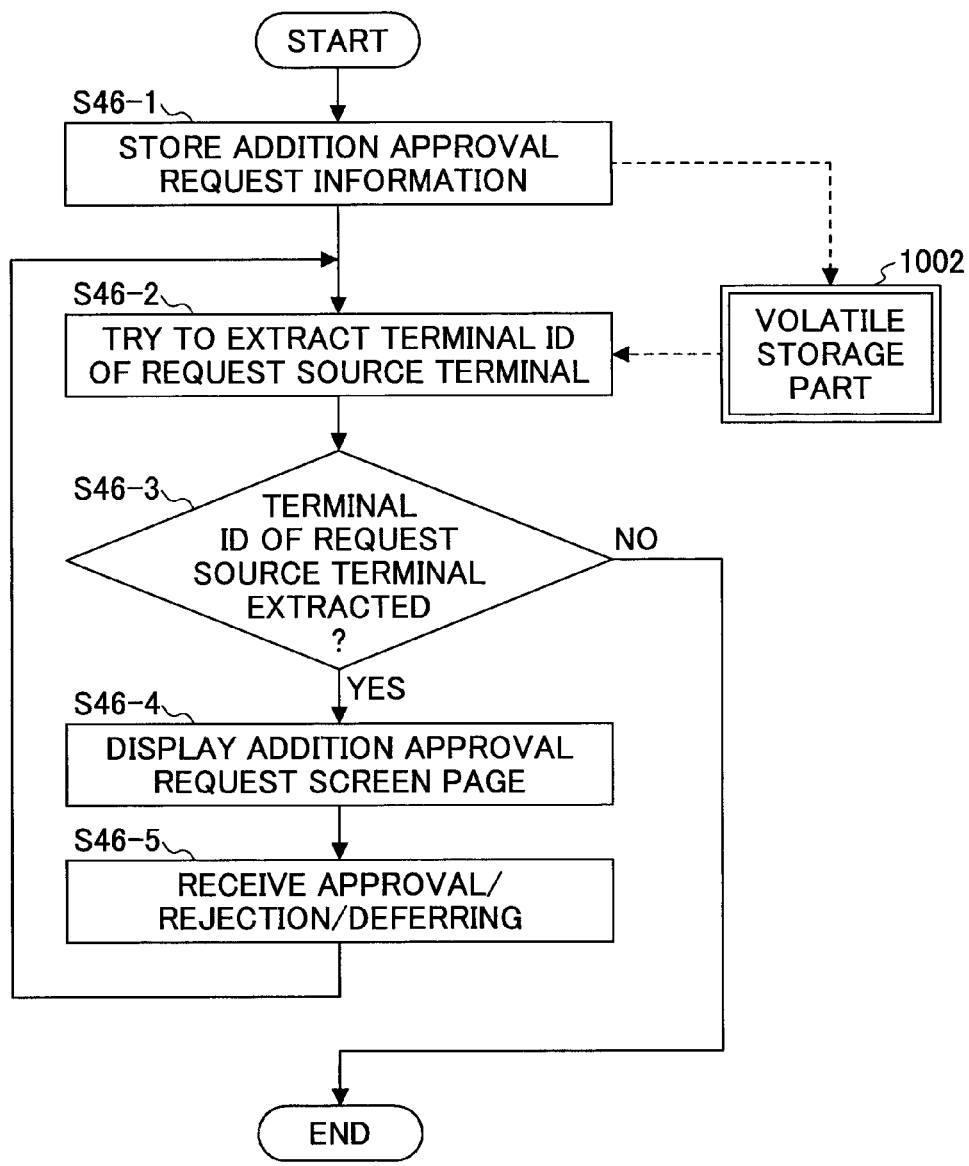
FIG. 16 is a flowchart showing a process of approval or rejection.
Figure 17:
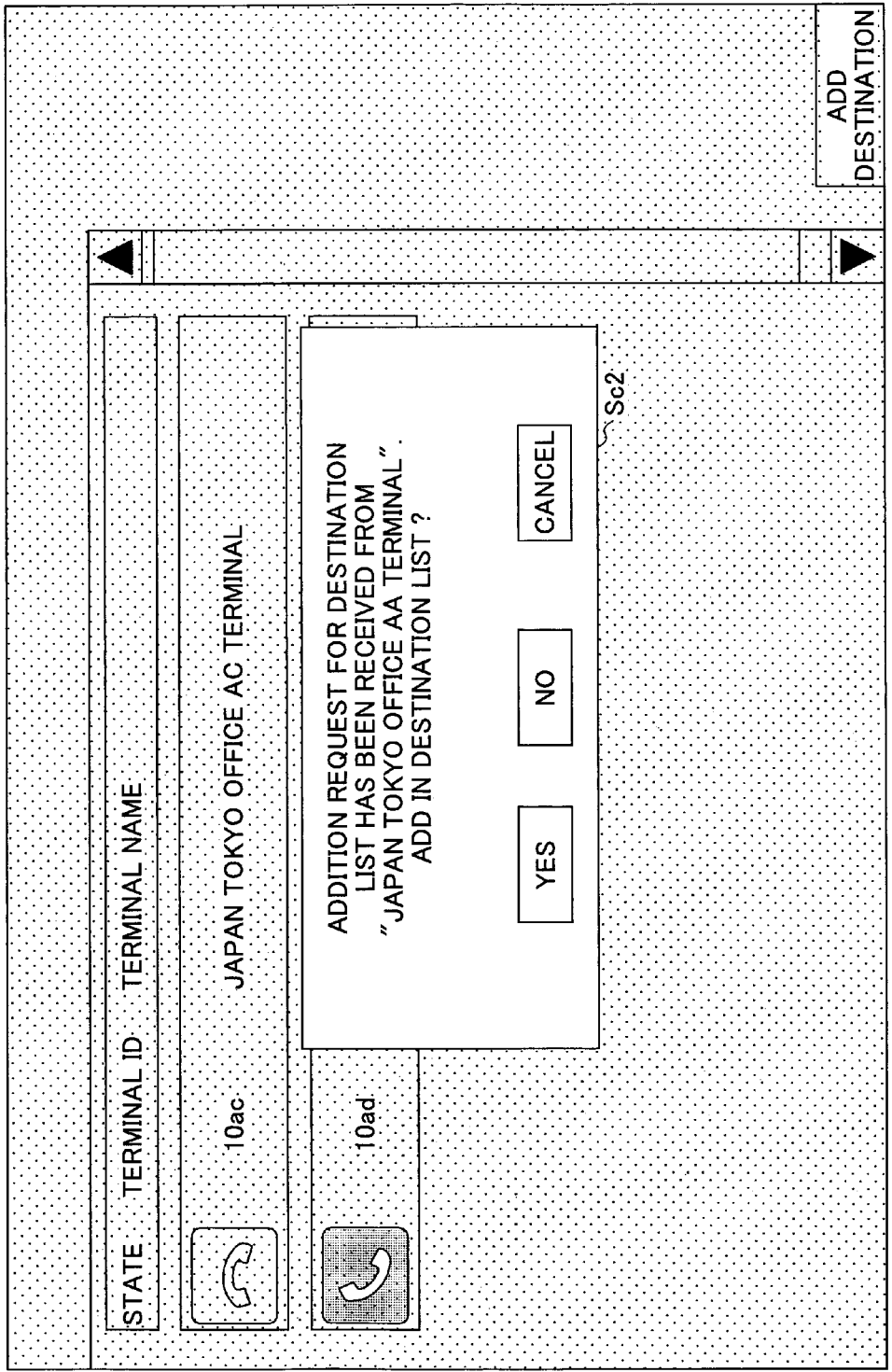
FIG. 17 shows a concept of an addition approval request screen page.
Figure 18:
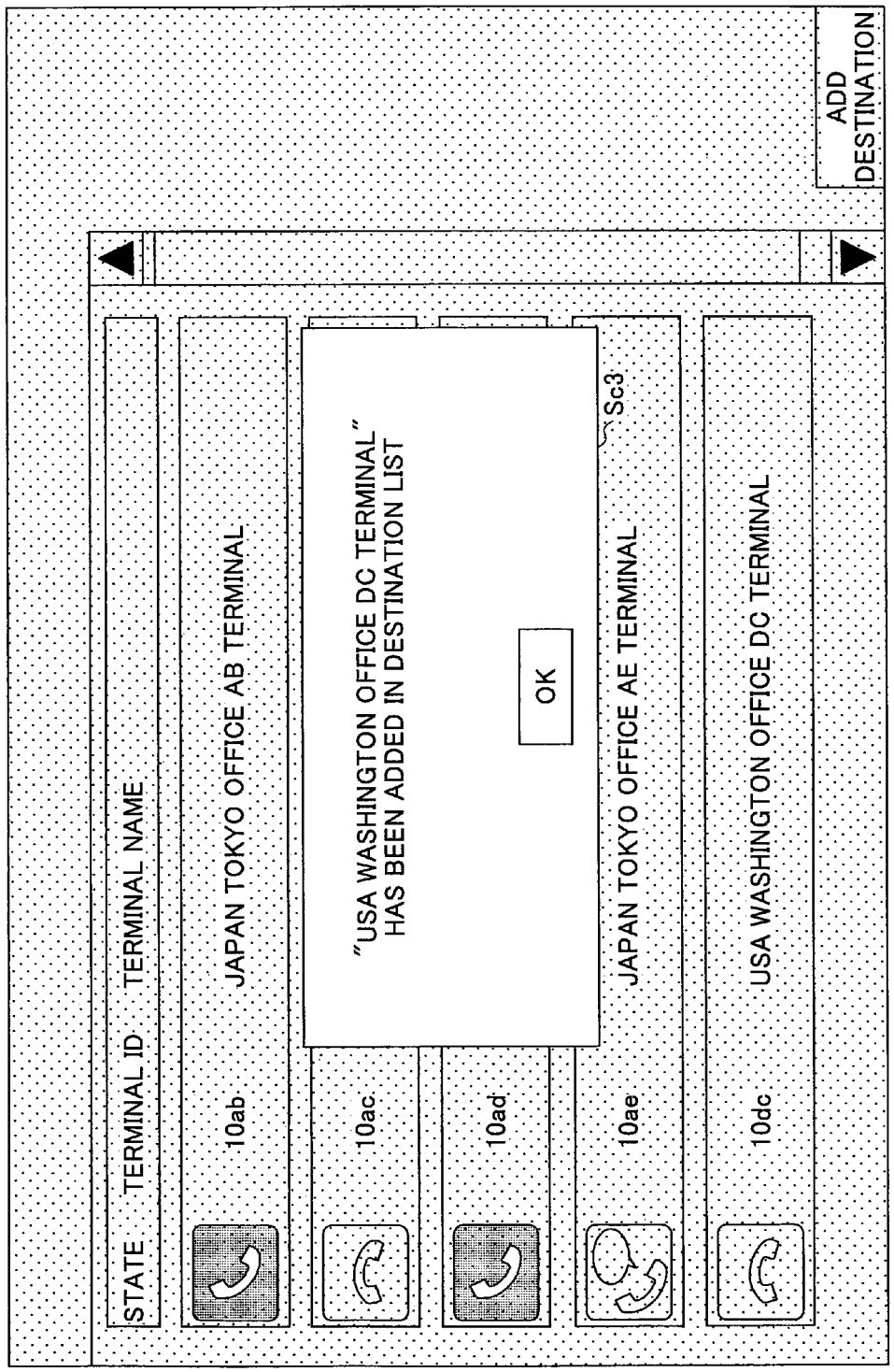
FIG. 18 shows a concept of an addition completion screen page.

Next, using FIGS. 14 through 18, a process of adding a destination candidate will be described. As one example, a case will be supposed where the request source terminal (terminal 10aa) requests to add a request target terminal (terminal 10dc) to the own destination list. It is noted that FIG. 14 is a sequence diagram showing a process of adding a destination candidate. FIG. 15 shows a concept of an addition request reception screen page. FIG. 16 is a flowchart showing a process of approval and rejection. FIG. 17 shows a concept of an addition approval request screen page. FIG. 18 shows a concept of an addition completion screen page.

First, the user "a" of the request source terminal (terminal 10aa) operates the operating button 108, and presses an "add destination" button displayed at a bottom right of the destination list shown in FIG. 13, and thereby, the operation input reception part 12 receives this pressing operation, and the display control part 16 displays an addition request reception screen page, data of which is stored in the volatile storage part 1002, on the display device 120aa. Thus, a process for receiving a request to add a destination candidate (step S41) can be carried out. The addition request reception screen page Sc1 is thus displayed, as shown in FIG. 15, over the destination list.

Next, when the user "a" operates the operating button 108, inputs the terminal ID or the terminal name of the terminal (in this example, the terminal ID "01dc") which the user intends to add as a destination candidate on the addition request reception screen page Sc1, and presses a "transmit addition request" button, the operation input reception part 12 receives this input by the user "a", and the transmission/reception part 11 transmits addition request information indicating the request to add the destination candidate to the transmission management system 50 via the communication network 2 (step S42). This addition request information includes terminal ID "01aa" of the request source terminal for identifying the request source terminal (terminal 10aa), and the terminal ID "01dc" of the request target terminal for identifying the request target terminal (terminal 10dc). Thereby, the transmission/reception part 51 of the transmission management system 50 receives the addition request information.

Next, in the transmission management system 50, the addition request management part 55 stores the received terminal ID "01aa" of the request source terminal at the terminal ID field for a request source terminal on a new record of the addition request management DB 5004 (see FIG. 11) and manages it, and also, additionally stores the terminal ID "01dc" of the request target terminal at the terminal ID field for a request target terminal on the new record and manages it (the first line in the addition request management table of FIG. 11) (step S43). It is noted that in FIG. 11, with respect to the same terminal ID "01ab", the terminal IDs of the different request target terminals ("01ca", "01da") are managed at separate records, respectively. However, this configuration is not limiting, and instead, it is also possible to manage the terminal IDs ("01ca", "01da") of the different request target terminals with respect to the terminal ID "01ab" of the same request source terminal on the same record.

Next, the terminal state determination part 56 searches the terminal management DB 5002 (see FIG. 9) based on the terminal ID "01dc" of the request target terminal, and determines the corresponding operating state (step S44). In a case where the terminal state determination part 56 has determined that the corresponding operating state is on-line and telephone call (transmission) has not been started, the transmission/reception part 51 then transmits addition approval request information indicating a request to approve the above-mentioned addition request, to the request target terminal (terminal 10dc) (step S45). This addition approval request information includes the terminal ID "01aa" of the request source terminal. Thereby, the transmission/reception part 11 of the request target terminal (terminal 10dc) receives the addition approval request information.

Next, the request target terminal (terminal 10dc) carries out, with respect to the addition request, a process of approval, rejection or deferring (step S46). The step S46 will be described in detail using FIGS. 16 and 17.

First, when the addition approval request information is received by the request target terminal (terminal 10dc), the storing/reading processing part 19 stores the received addition approval request information in the volatile storage part 1002 (step S46-1 in FIG. 16). It is noted that in a case where plural sets of the addition approval request information are transmitted one after another, these are stored in the volatile storage part 1002 one after another.

Next, the extraction part 17 tries to extract the terminal ID of the request source terminal included in the addition approval request information from the volatile storage part 1002 (step S46-2). It is noted that in a case where plural sets of the addition approval request information are stored, the terminal IDs included in the respective sets of the addition approval request information are extracted one by one.

Then, in a case where the terminal ID of the request source terminal has been extracted (step S46-2 and step S46-3 YES), the display control part 16 displays, as shown in FIG. 17, an addition approval request screen page Sc2 on the display device 120dc (step S46-4). This addition approval request screen page Sc2 includes the terminal ID or the name of the request source terminal. Then, the user "d" of the request target terminal (terminal 10dc) presses the "yes" button indicated on the addition approval request screen page Sc2 in a case where the user "d" of the request target terminal (terminal 10dc) approves the request target terminal (terminal 10dc) being registered in the destination list of the request source terminal (terminal 10aa). The user "d" of the request target terminal (terminal 10dc) presses the "no" button indicated on the addition approval request screen page Sc2 in a case where the user "d" does not approve the request target terminal being registered in the destination list of the request source terminal (terminal 10aa). The user "d" of the request target terminal (terminal 10dc) presses the "cancel" button indicated on the addition approval request screen page Sc2 in a case where the user "d" defers determining whether to approve the own terminal being registered in the destination list of the request source terminal (terminal 10aa). It is noted that in a case where the terminal name of the request source terminal is displayed as shown in FIG. 17, the addition approval request information transmitted in step S45 includes, in addition to the terminal ID of the request source terminal, the terminal name of the request source terminal. Further, in this case, the terminal name of the request source terminal is extracted when the operating state of the request source terminal is determined in step S44.

Next, when the user "d" presses any one of the "yes", "no" and "cancel" buttons on the addition approval request screen page Sc2, the operation input reception part 12 receives the instruction of the any one of "yes", "no" and "cancel" (step S46-5). Then, further, step S46-2 is returned to, extraction of the terminal ID(s) of the remaining request source terminal(s) stored in the volatile storage part 1002 is tried, and thus, the process is repeated until the terminals ID(s) of all of the request source terminal(s) has (have) been extracted. When the terminals ID(s) of all of the request source terminal(s) has (have) been extracted (step S46-3 NO), the process of step S46 is finished.

Next, returning to FIG. 14, the transmission/reception part 11 of the request target terminal (terminal 10dc) transmits, to the transmission management system 50, addition request response information indicating the response to the request to add the destination candidate, i.e., the anyone of "approval", "rejection" and "deferring" (step S47). Thereby, the transmission/reception part 51 of the transmission management system 50 receives the addition request response information. Here, a case will be supposed where the response to the request to add the destination candidate indicates "approval".

Next, the destination list management part 57 associates the terminal ID "01dc" of the request target terminal, associated with the terminal ID "01aa" of the request source terminal in the addition request management DB 5004 (see FIG. 11), with the terminal ID "01aa" of the request source terminal in the destination list management DB (see FIG. 10), the same as the terminal ID "01aa" of the request source terminal included in the addition request management DB 5004 (see FIG. 11), and additionally manages the terminal ID "01dc" of the request target terminal (step S48).

In a case where the response to the request to add the destination candidate indicates "rejection", in step S48, the addition request management part 55 deletes the record of the terminal ID "01dc" of the rejected request target terminal from the addition request management DB 5004 (see FIG. 11). In a case where the response to the request to add the destination candidate indicates "deferring", in step S48, the addition request management part 55 does not carry out such additional management, and the destination list management part 57 does not delete the corresponding record from the addition request management DB 5004 (see FIG. 11) and leaves the record as it is.

Next, the extraction part 54 searches the terminal management DB 5002 (see FIG. 9) based on the terminal ID "01aa" of the request source terminal and the terminal ID "01dc" of the request target terminal, and extracts the respective sets of information (terminal names (destination names) and operating states) (step S49). Then, the transmission/reception part 51 transmits the respective sets of addition completion information to the request source terminal (terminal 10aa) and the request target terminal (terminal 10dc) (steps S50-1, S50-2). In the set of addition completion information, from among the respective sets of addition completion information, transmitted to the request source terminal (terminal 10aa) includes a message indicating the completion of the addition of the destination candidate, and the information (terminal-ID, terminal name (destination name) and operating state) of the request target terminal (10dc). That is, to the request source terminal (terminal 10aa), only the information (terminal ID, terminal name (destination name) and operating state), i.e., the part of the destination list concerning the request target terminal (terminal 10dc) is transmitted, and thus, all of the destination list is not newly transmitted. On the other hand, the set of the addition completion information transmitted to the request target terminal (terminal 10dc) includes a message indicating the completion of the addition of the destination candidate, and the information (terminal ID, terminal name (destination name) and operating state) of the request source terminal (terminal 10aa).

Then, in the request source terminal (terminal 10aa) and the request target terminal (terminal 10dc), the respective display control parts 16 display screen pages indicating the completion on the respective display devices (120aa and 120dc) (steps S51-1 and S51-2). FIG. 18 shows an addition completion screen page Sc3 displayed on the display device 120aa of the request source terminal (terminal 10aa). When the user "a" of the request source terminal (terminal 10aa) presses the "OK" button (for confirmation) on the addition completion screen page Sc3, the process is finished. As a result of the addition completion screen page Sc3 being thus displayed, the user "a" of the request source terminal (terminal 10aa) can early know that the request to add the destination candidate has been approved, and thus, can immediately start a TV conference with the thus-added destination terminal (terminal 10dc).

It is noted that in the transmission management system 50, when the processes of steps S50-1 and S50-2 have been finished, the addition request management part 55 deletes the record of the terminal ID "01dc" of the approved request target terminal from the addition request management DB 5004 (see FIG. 11), and thus, processing the request to add the destination candidate is finished (step S52).

<<Main Advantageous Effect of First Embodiment>>

Thus, as described above, according to the first embodiment, before adding a destination candidate to a destination list, the transmission management system 50 inquires of a terminal 10 which becomes the destination candidate whether inclusion of the own terminal as the destination candidate in the destination list is approvable. Thereby, the user "d" of the terminal 10 which otherwise becomes the destination candidate can prevent the own terminal from being included in the destination list of the other user "a" without approval.

[Second Embodiment]

Next, using FIGS. 19 through 25, a second embodiment of the present invention will be described. In a transmission system 1' according to the second embodiment, in comparison to the transmission system 1 according to the first embodiment described above, further respective user PC (Personal Computer) terminals (20a, 20b, 20c and 20d) are connected with the respective LANs (2a, 2b, 2c and 2d), and further, a transmission terminal management system 80 is connected with the Internet 2i. The same reference numerals are given to the same configurations and the same functions, and the duplicate description therefor will be omitted.

Further, hereinafter, the user PC terminals (20a, 20b, 20c and 20d) will be referred to as PC (20a, 20b, 20c and 20d), respectively, and further, any PC thereof will be referred to as "PC 20".

Further, according to the second embodiment, in order to solve a problem which may occur when the user lacks experience of operating the operating buttons 108 and/or inputting information to the terminal 10 or the user who is using the PC 20 cannot immediately recognize that the above-mentioned addition approval request has been given, necessary operating and inputting information can be carried out using the PC 20 which the user has used for a long time instead of the terminal 10. Further, the transmission terminal management system 80 carries out communication with the PC 20, and thus, informs the transmission management system 50 of various requests and so forth from the PC 20.

Further, the PC 20 and the transmission terminal management system 80 have the same external appearances as those of common server computers, and therefore, description of external appearances thereof will be omitted. Further, each of the PC 20 and the transmission terminal management system 80 has the same hardware configuration as that of the above-mentioned transmission management system 50, and therefore, description of hardware configuration thereof will be omitted.

<<Functional Configuration of Second Embodiment>>

Figure 19:
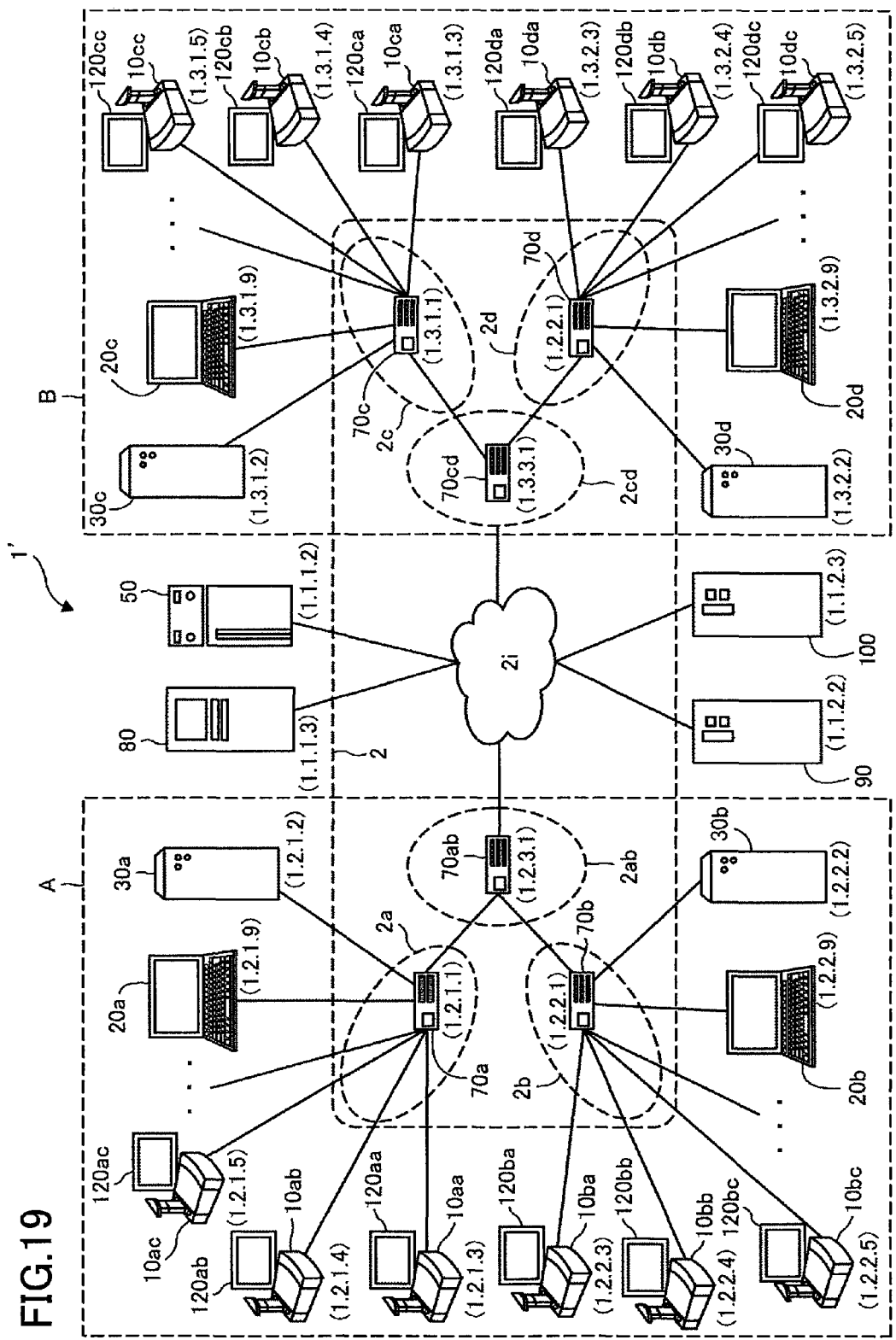
FIG. 19 is a general view of a transmission system according to a second embodiment of the present invention.
Figure 20:
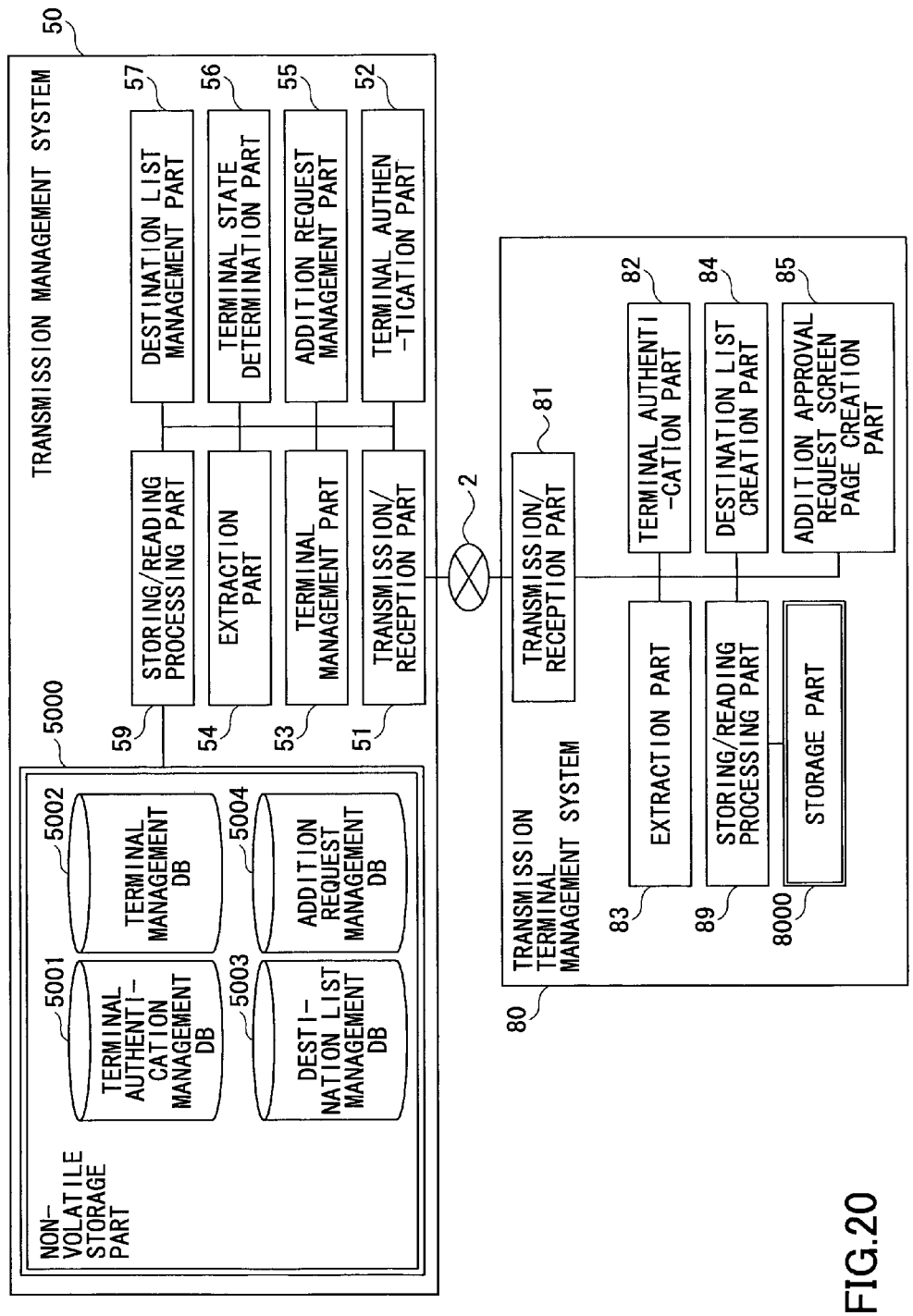
FIG. 20 is a functional block diagram of a transmission management system and a transmission terminal management system included in the transmission system according to the second embodiment.

Next, a functional configuration of the second embodiment will be described. FIG. 20 shows a functional block diagram of the transmission management system 50 and the transmission terminal management system 80 included in the transmission system 1' according to the second embodiment. In FIG. 20, the transmission management system 50 and the transmission terminal management system 80 are connected together by the communication network 2 in such a manner that data transmission can be mutually carried out. Further, the PC 20 shown in FIG. 19 is omitted in FIG. 20 because the PC 20 is an all-purpose PC.

<Functional Configuration of Transmission Terminal Management System>

The transmission terminal management system 80 includes a transmission/reception part 81, a terminal authentication part 82, an extraction part 83, a destination list creation part 84 and an addition approval request screen page creation part 85. These respective parts correspond to functions or functioning parts realized as a result of the respective elements/components shown in FIG. 6 operating according to instructions given by the CPU 201 that operates according to the program for the transmission terminal management system developed on the RAM 203 from the HD 204.

Further, the transmission terminal management system 80 includes a storage part 8000 provided by the RAM 203 or HD 204 shown in FIG. 6.

(Detailed Functional Configuration of Transmission Terminal Management System)

Next, the functional configuration of each of the parts included in the transmission terminal management system 80 will be described in detail. It is noted that below along with describing the respective functional configurations of the parts of the transmission terminal management system 80, relationships with main elements/components, from among those shown in FIG. 6, used for realizing the respective functional configurations of the parts of the transmission terminal management system 80 will be also described.

The transmission/reception part 81 is realized by instructions from the CPU 201 shown in FIG. 6 and the network I/F 209 shown in FIG. 6, and carries out transmission and reception of various sorts of data (information) with another set of equipment such as a terminal 10, a relay apparatus 30 or a system 50, 90 or 100 via the communication network 2. Further, the transmission/reception part 81 also has a Web server function and a data processing function described later.

The terminal authentication part 82 is realized by instructions from the CPU 201, accesses the transmission management system 50, searches the terminal authentication management DB 5001 (see FIG. 8) included in the non-volatile storage part 5000 and carries out authentication as to whether the terminal 10 of the user of the PC 20 is a proper terminal for a TV conference by determining whether the same set of terminal ID and password as that of the request source terminal is managed in the terminal authentication management DB 5001.

The extraction part 83 is realized by instructions from the CPU 201 shown in FIG. 6, searches the destination list management DB 5003 (see FIG. 10) in the non-volatile storage part 5000 of the transmission management system 50 using the terminal ID of a request source terminal, and extracts the terminals ID of the corresponding destination terminals. Further, the extraction part 54 searches the addition request management DB 5004 (see FIG. 11) using the terminal ID of a request target terminal, and extracts the terminal ID of the corresponding request source terminal.

The destination list creation part 84 is realized by instructions given by the CPU 201 shown in FIG. 6, and creates a HTML (Hyper Text Markup Language) file of a destination list screen page shown in FIG. 22.

The addition approval request screen page creation part 85 creates an HTML file of an addition approval request screen page based on the terminal ID of the request source terminal extracted by the extraction part 83.

<<Processing/Operations of Second Embodiment>>

Next, using FIGS. 21 through 25, processes carried out in the second embodiment will be described.

According to the second embodiment, the user "a" of the request source terminal (terminal 10*aa*) sends an addition approval request to the request target terminal (terminal 10*dc*) via the transmission terminal management system 80 by using the PC 20*a* instead of the terminal 10*aa*.

Figure 21:
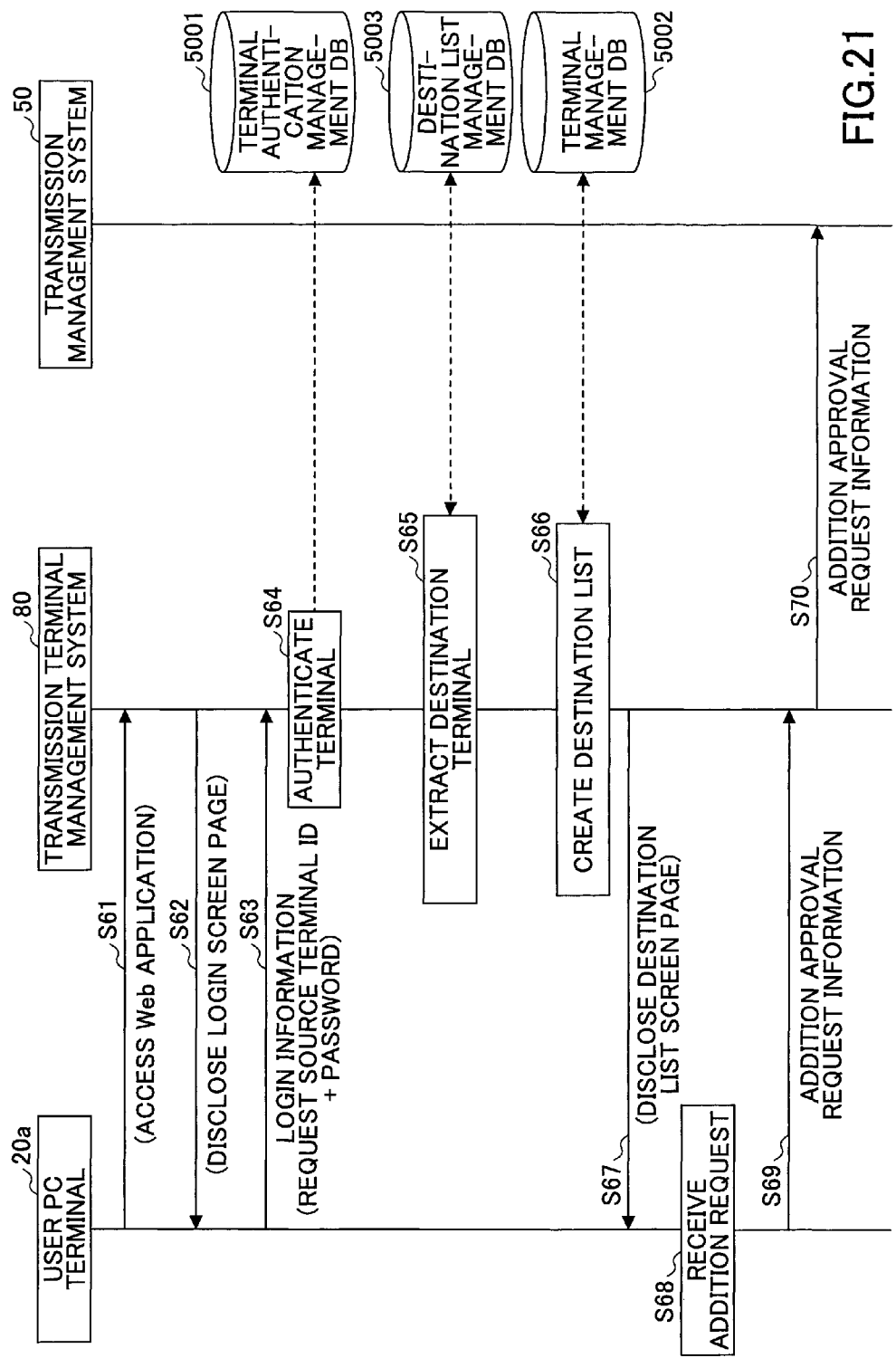
FIG. 21 is a sequence diagram showing a process of carrying out an addition approval request from a user PC terminal.

It is noted that FIG. 21 is a sequence diagram showing a process of carrying out a request to approve adding a destination candidate (i.e., an addition approval request), from a PC 20. FIG. 22 shows a concept of the destination list. FIG. 23 shows a concept of the addition request reception screen page.

As shown in FIG. 21, first, the user "a" of the PC 20*a* inputs a URL using a Web browser of the PC 20*a*, and thereby, the PC 20*a* accesses a Web application provided by the transmission terminal management system 80 (step S61). Thereby, the Web server function of the transmission/reception part 81 of the transmission terminal management system 80 discloses a login screen page to the PC 20*a*, and thereby, urges the user "a" to input the terminal ID of the request source terminal (terminal 10*aa*) and the password (step S62). When the user "a" inputs the request source terminal (terminal 10*aa*) ID and the password in response thereto, login information including the request source terminal (terminal 10*aa*) ID and the password is transmitted to the transmission terminal management system 80 from the PC 20*a* (step S63).

Next, the terminal authentication part 82 of the transmission management system 80 accesses the transmission management system 50, searches the terminal authentication management DB 5001 (see FIG. 8) provided in the non-volatile storage part 5000, and determines whether the terminal 10*aa* of the user "a" of the PC 20*a* is a proper user in the transmission system 1' by determining whether the same set of terminal ID and password as the terminal ID and the password of the request source terminal are managed (step S64). In a case where it has been determined, in the authentication process, that the request source terminal is a proper terminal, the extraction part 83 then searches the destination list management DB 5003 (see FIG. 10) provided in the non-volatile storage part 5000 of the transmission management system 50 based on the terminal ID "01*ga*" of the request source terminal 10*aa*, and extracts the terminal IDs of the corresponding destination terminals (step S65).

Next, the destination list creation part 84 searches the terminal management DB 5002 (see FIG. 9) based on the terminal IDs extracted in the above-mentioned step S65, extracts the corresponding terminal names, and thus, creates a HTML file of a destination list screen page shown in FIG. 22 (step S66). Then, the Web server function of the transmission/reception part 81 discloses the destination list screen page to the PC 20*a* (step S67). On the destination list screen page, as shown in FIG. 22, the destination names of the respective destination terminals, the terminal IDs of the destination terminals, and an operation area for editing the destination name of each destination terminal on the destination list or deleting a destination name and a terminal ID of a destination terminal from the destination list, are displayed. Further, at a top right corner of the destination list screen page shown in FIG. 22, an "add destination" button for the user to press in a case where the user intends to add a destination candidate is displayed.

Next, when the user "a" of the PC 20*a* presses the "add destination" button on the destination list screen page, the Web browser function of the PC 20*a* displays an addition request reception screen page Sc4 such as that shown in FIG. 23. Thereby, the PC 20a can receive an addition approval request from the addition request reception screen page Sc4 (step S68). The addition approval request screen page Sc4 has the same form as the addition request reception screen page Sc1 shown in FIG. 15, and therefore, duplicate description thereof will be omitted.

Next, when the user "a" inputs the terminal ID and the terminal name of the request target terminal, which the user intends to add to the destination list, from the addition request reception screen page Sc4, and presses a button of "transmit addition request", the PC 20a transmits addition approval request information to the transmission terminal management system 80 (step S69). Thereby, the data processing function of the transmission/reception part 81 of the transmission terminal management system 80 interprets the above-mentioned operations carried out by the user "a", and transmits addition approval request information for the destination list to the transmission management system 50 on behalf of the terminal 10aa (step S70). Processes thereafter are the same as those of steps S46 through S52 in FIG. 14, and therefore, duplicate description therefor will be omitted.

Next, using FIGS. 24 and 25, a case will be described where the user "d" of the request target terminal 10dc sends an addition request response using a PC 20d. Here, a case will be described where the user "d" determines, immediately after starting up the PC 20d, whether an addition approval request has been received from another terminal 10 or another PC 20. It is noted that this case is one example, and determination as to whether an addition approval request has been received may be carried out by the user "d", after the user "d" starts up the PC 20d, periodically or at any time.

Figure 24:
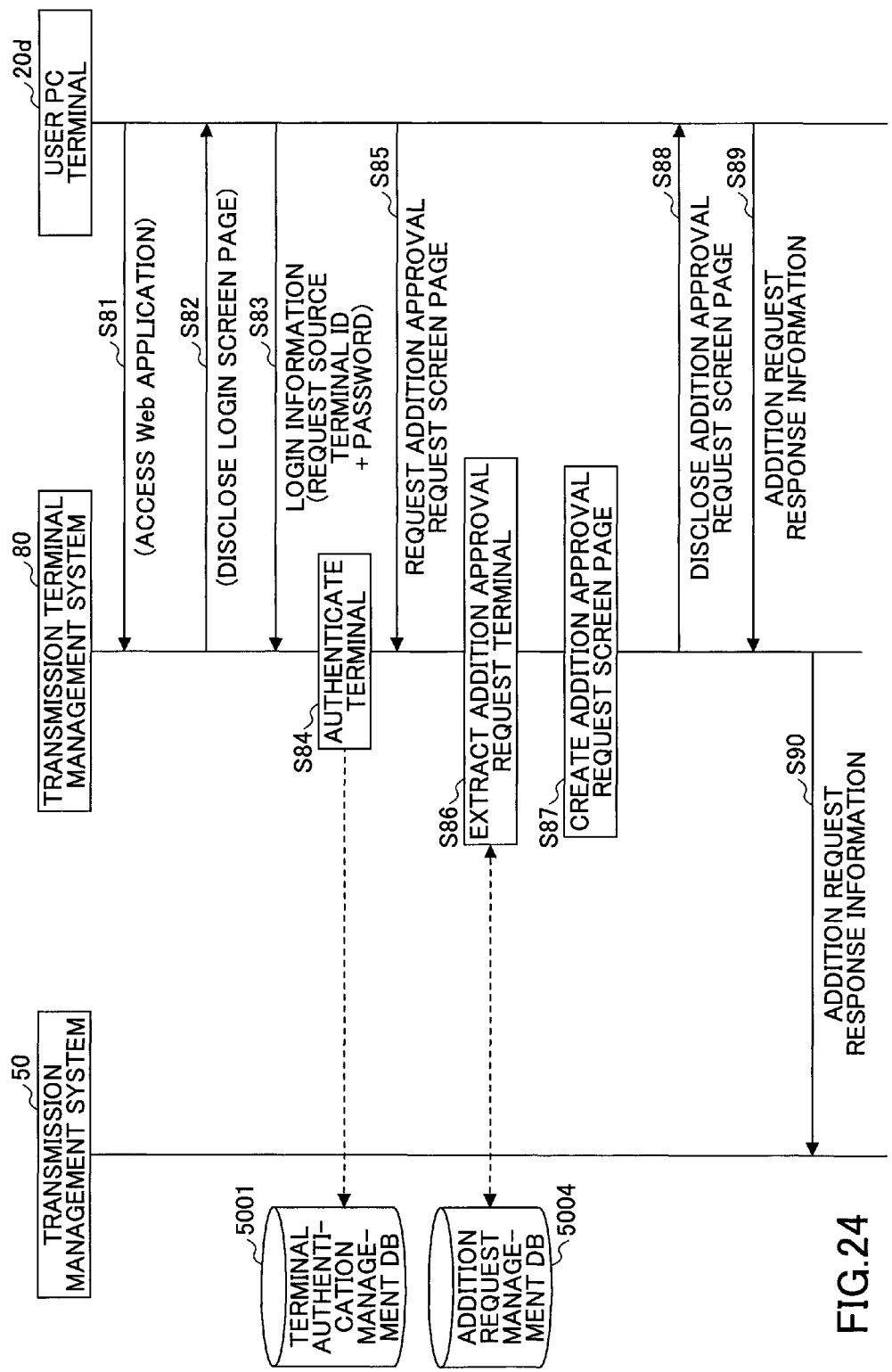
FIG. 24 shows a sequence diagram of a process of carrying out an addition request response from a user PC terminal.

It is noted that FIG. 24 shows a sequence diagram for a case where the user of a request target terminal sends an addition request response by using a PC 20. FIG. 25 shows a concept of an addition approval request screen page. Further, steps S81 through S84 in FIG. 24 are the same processes as those of steps S61 through S64 in FIG. 21, and duplicate description therefor will be omitted.

First, the user "d" of the request target terminal 10dc sends a request to display an addition approval request screen page to the transmission terminal management system 80 (step S85). Thereby, in the transmission terminal management system 80, the extraction part 83 searches the addition request management DB 5004 (see FIG. 11) based on the terminal ID "01dc" of the request target terminal (terminal 10dc), and extracts the terminal ID "01aa" of the corresponding request source terminal (step S86). It is noted that the extraction part 83 may further search the terminal management DB 5002 (see FIG. 9) based on the terminal ID "01aa" of the request source terminal extracted in step S86, and extract the corresponding destination name (terminal name).

Next, the addition approval request screen page creation part 85 creates a HTML file of an addition approval request screen page based on the terminal ID "01aa" of the request source terminal (terminal 10aa) extracted in step S86 (step S87). Then, the Web server function of the transmission/reception part 81 discloses the addition approval request screen page such as that shown in FIG. 25 to the PC 20d (step S88).

Figure 25:
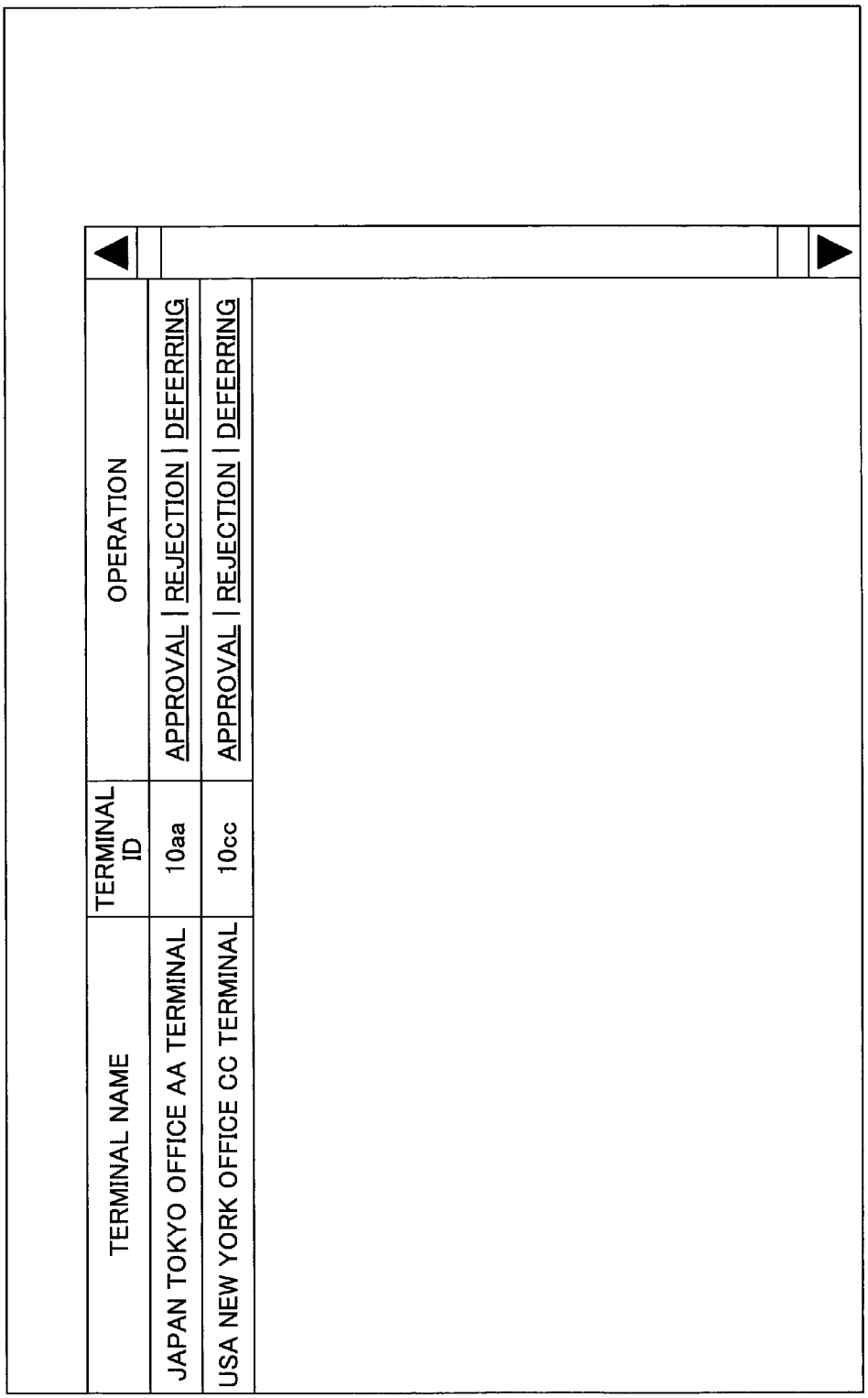
FIG. 25 shows a concept of an addition approval request screen page.

Next, when the user "d" selects any one of "approval", "rejection" and "deferring" from the addition approval request screen page shown in FIG. 25, addition request response information indicating the selected one of "approval", "rejection" and "deferring" is transmitted to the transmission terminal management system 80 from the PC 20d (step S89). Then, the data processing function of the transmission/reception part 81 of the transmission terminal management system 80 interprets the above-mentioned operations carried out by the user "d", and transmits addition request response information to the transmission management system 50 on behalf of the request target terminal (terminal 10dc) from the transmission/reception part 81 (step S90). Processes thereafter are the same as those of steps S46 through S52 in FIG. 14, and therefore, duplicate description therefor will be omitted.

<<Main Advantageous Effects of Second Embodiment>>

According to the second embodiment described above, in addition to the advantageous effects of the first embodiment, an advantageous effect of solving a problem is obtained, which problem may occur in a case where the user "d" of the terminal 10 is not so skilled in operating the operating buttons 108 of the terminal 10dc and/or a work of inputting, or a case where the user "d" who is using the PC 20d cannot immediately determine that the above-mentioned addition approval request has been received.

[Third Embodiment]

Figure 26:
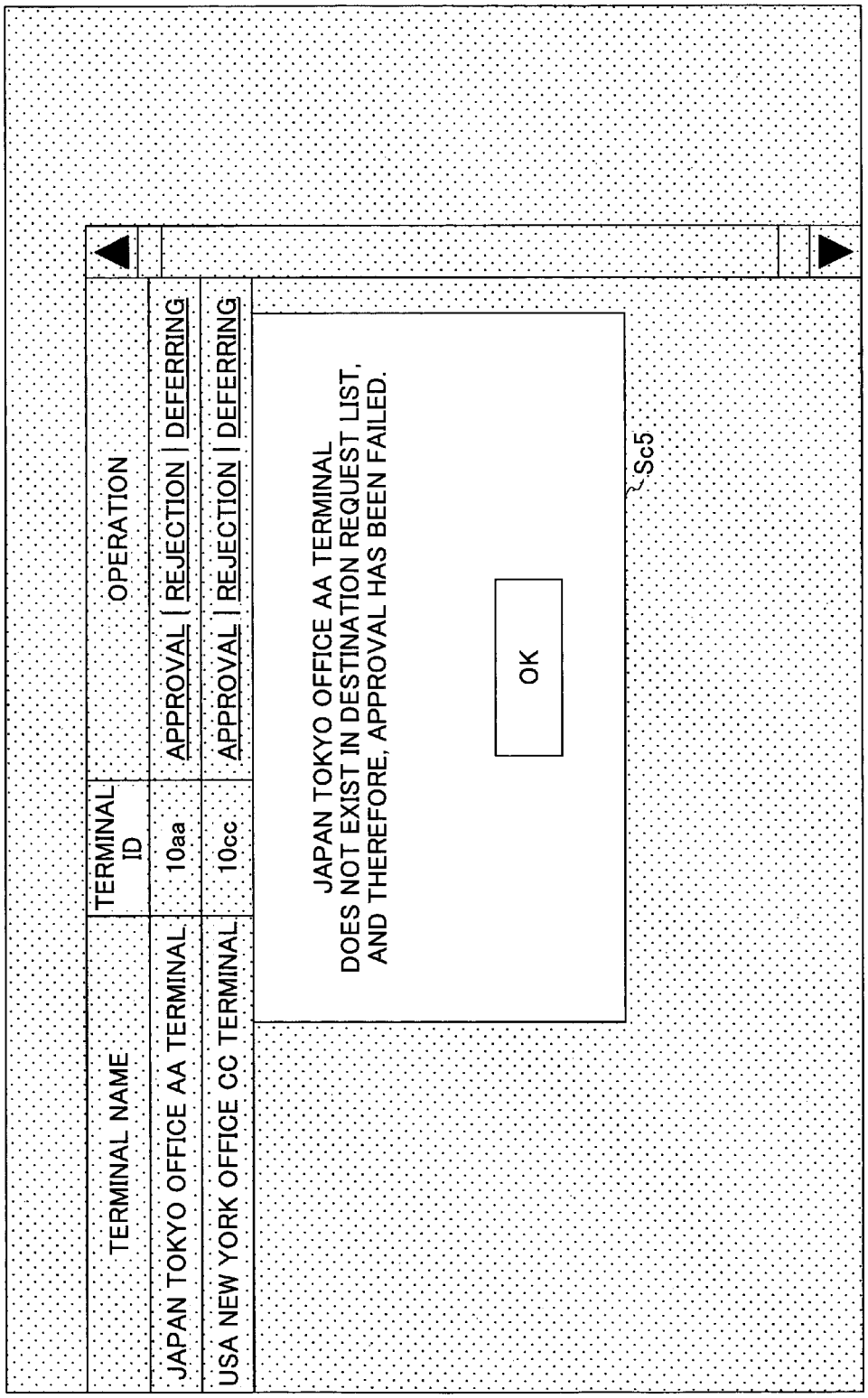
FIG. 26 is a concept showing a failure screen page at a PC according to a third embodiment of the present invention.
Figure 27:
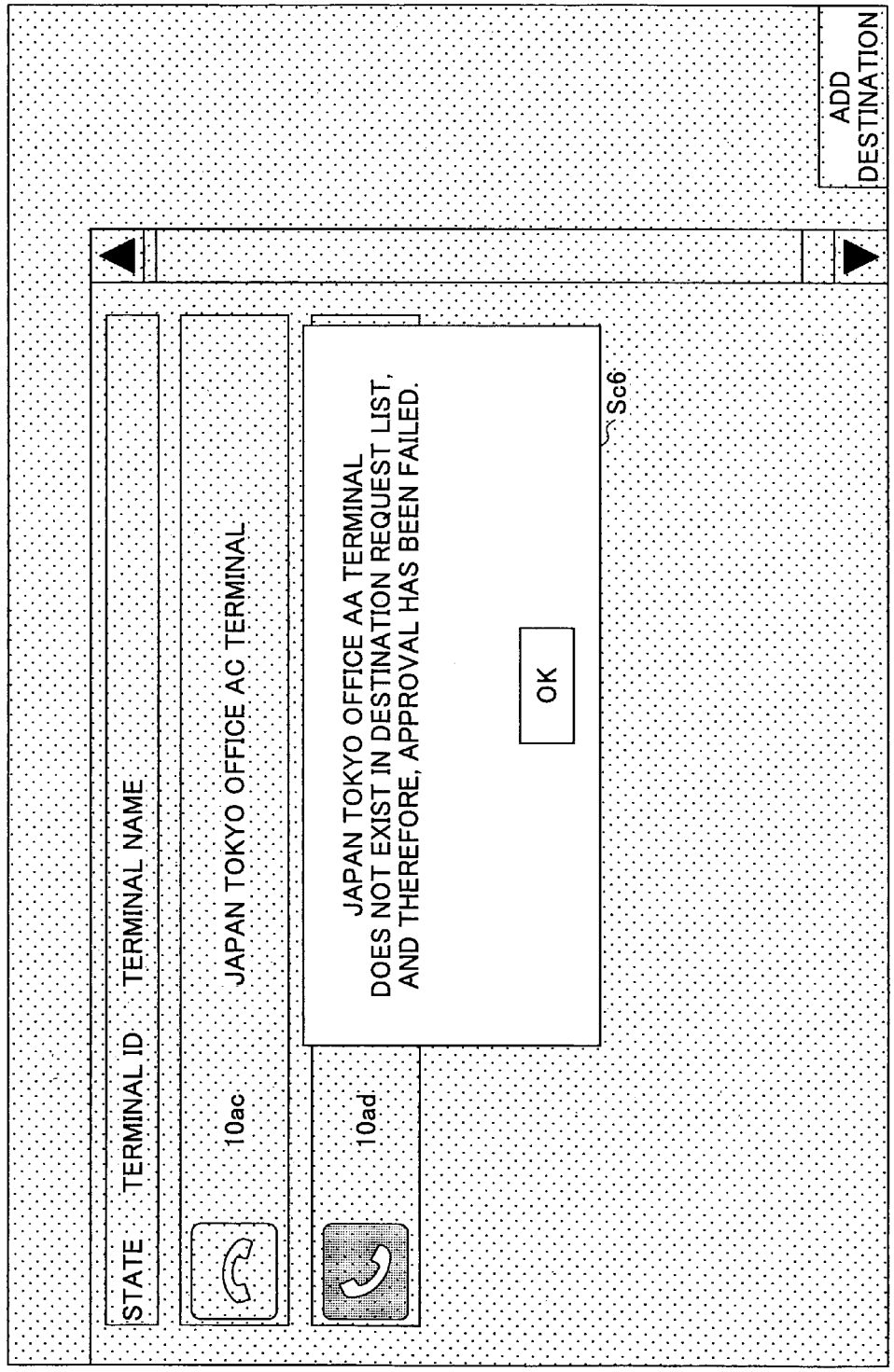
FIG. 27 is a concept showing a failure screen page at a terminal according to the third embodiment of the present invention.

Next, using FIGS. 26 and 27, a third embodiment of the present invention will be described. FIG. 26 shows a concept of a failure screen page Sc5 at a PC 20 according to the third embodiment. FIG. 27 shows a concept of a failure screen page Sc6 at a terminal 10 according to the third embodiment.

In the above description for the second embodiment, a case has been described where each business office is regarded as a virtual person, who operates the terminal 10 or the PC 20. In the description for the third embodiment, in order to distinguish between the operator of the terminal 10 and the operator of the PC 20, it is supposed that, for example, as a user "d", plural speakers (participants) belong to the Washington, D.C. office, who carry out conversations using terminals (10da, 10db, 10dc, . . . ) or a PC 20d, with other terminals 10, for example. The speakers are, for example, employees of the user "d". In the same way, it is supposed that speakers belong to the user "a" as the Tokyo office, speakers belong to the user "b" as the Osaka office, and speakers belong to the user "c" as the New York office.

Specifically, according to the third embodiment, in the Washington, D.C. office as the user "d", approximately at the same time, a speaker d1 as an employee of the user "d" uses the terminal 10dc and a speaker d2 as another employee of the user "d" uses the PC 20d.

Further, the third embodiment has the same configuration as the transmission system 1' of the second embodiment, and also, corresponds to a case where the first embodiment and the second embodiment are combined. That is, according to the third embodiment, in state where both the request target terminal (terminal 10dc) and the PC 20d have been started up, addition approval request information is sent to the request target terminal (terminal 10dc) as in step S45 (FIG. 14) of the first embodiment, and also, an addition approval request information screen page is disclosed to the PC 20d as in step S88 (FIG. 24) of the second embodiment. Then, in such a case, the transmission management system 50 adopts one of the request target terminal (terminal 10dc) and the PC 20d, which has carried out a process of "approval" or "rejection" earlier in response to the addition approval request for the destination list.

Therefore, according to the third embodiment, immediately before step S52 shown in FIG. 14, the addition request management part 55 of the transmission management system 50 searches the addition request management DB 5004 (see FIG. 11) and determines whether a record exists on which the terminal ID of the request target terminal (10dc) is managed at the field of a terminal ID of a request target terminal. For example, even when the PC 20*d* transmits addition request response information in step S89 shown in FIG. 24 after the request target terminal (10*dc*) first transmits addition request response information ("approval" or "rejection") in step S47 shown in FIG. 14, the above-mentioned record has been already deleted in step S52. Therefore, the transmission management system 50 discloses a failure screen page Sc5 such as that shown in FIG. 26 to the PC 20*d* via the transmission terminal management system 80. Thereby, the speaker d2 at the PC 20*d* can determine that another person has already responded to the addition approval request.

In contrast thereto, even when the request target terminal (10*dc*) transmits addition request response information in step S47 shown in FIG. 14 after the PC 20*d* first transmits addition request response information ("approval" or "rejection") in step S89 shown in FIG. 24, the above-mentioned record has been already deleted in step S52. Therefore, the transmission management system 50 transmits a failure screen page Sc6 such as that shown in FIG. 27 to the request target terminal (terminal 10*dc*). Thereby, the speaker d1 at the request target terminal (10*dc*) can determine that another person has already responded to the addition approval request.

It is noted that in a case where addition request response information first transmitted indicates "deferring", the above-mentioned record has not been deleted. Therefore, in a case where addition request response information transmitted thereafter indicates "approval" or "rejection", the addition request response information transmitted thereafter is adopted.

<Main Advantageous Effects of Third Embodiment>

As described above, according to the third embodiment, one of a request target terminal 10 and a PC 20, which has earlier processed an addition approval request by "approval" or "rejection", is preferentially adopted, and a notification indicating that the process has failed is sent to the one which has thereafter processed the addition approval request by "approval" or "rejection". Thereby, the speaker who has thereafter processed the addition approval request by "approval" or "rejection" can determine that another person has already approved or rejected the addition approval request. Further advantageously, the speaker who has first processed the addition approval request by "approval" or "rejection" can be free from being worried that the own processing ("approval" or "rejection") may be thereafter changed by another.

[Supplement to Embodiments]

It is noted that each of the relay apparatuses 30, the transmission management system 50, the transmission terminal management system 80, the program providing system 90 and the maintenance system 100 in the first, second and third embodiments may be realized by a single computer, or may be realized by plural computers where respective parts (or functions) are divided and are freely allocated to the plural computers. Further, in a case where the program providing system 90 is realized by a single computer, a program to be transmitted by the program providing system 90 may be transmitted as having been divided into plural modules, or may be transmitted as not having been divided into plural modules. Further, in a case where the program providing system 90 is realized by plural computers, divided plural modules may be transmitted by the plural computers, respectively.

Further, recording media storing the program for the terminal, the program for the relay apparatus, the program for transmission management and the program for the transmission terminal management system, the HD 204 storing these programs, and the program providing system 90 including the HD 204 are used as program products in a case where the program for the terminal, the program for the relay apparatus, the program for transmission management and the program for the transmission terminal management system are provided to users or such in the home country or aboard.

Further, in the above-mentioned embodiments, as an example of the transmission system 1 or 1', a case of a TV conference system has been described. However, it is not necessary to be limited thereto, and an example of the transmission system 1 or 1' may be a telephone system for IP (Internet Protocol) telephone, Internet telephone, or such. Further, the transmission system 1 or 1' may be an automotive navigation system. In this case, one of the terminals 10 corresponds to an automotive navigation apparatus mounted in one automobile, and another of the terminals 10 corresponds to a management terminal or a management server in a management center which manages the automotive navigation system, or an automotive navigation apparatus mounted in another automobile.

Further, the transmission system 1 may be a communication system for cellular phones. In this case, the terminals correspond to cellular phones.

Further, in the above-mentioned embodiments, as one example of content data, image data as sight data and voice data as hearing data have been described. However, it is not necessary to be limited thereto, and others of the five senses may be used instead. An example of content data may be touch data. In this case, a feeling occurring when a user touches something on the side of one of the terminals is transmitted to the side of another of the terminals. Further, content data may be smell data. In this case, a smell (or odor) occurring on the side of one of the terminals 10 is transmitted to the side of another of the terminals 10. Further, content data may be taste data. In this case, a taste obtained on the side of one of the terminals 10 is transmitted to the side of another of the terminals 10.

Further, it may be sufficient that content data is at least any one of image (sight) data, voice (hearing) data, touch data, smell data and taste data.

Further, in the above-mentioned embodiments, the case where the TV conference is conducted by using the transmission system 1 or 1' has been described. However, it is not necessary to be limited thereto. The transmission system 1 or 1' may be used for a meeting, a common conversation between family members, friends or such, or may be used for submitting information in one direction.

Although this invention has been described in detail with reference to certain embodiments, variations and modifications exist within the scope and spirit of the invention as described and defined in the following claims.

The present Patent Application is based on Japanese Priority Application No. 2010-267744 filed Nov. 30, 2010 and Japanese Priority Application No. 2011-217039 filed Sep. 30, 2011, the entire contents of which are hereby incorporated by reference.

The invention claimed is:

1. A transmission management system which manages communication between a request source terminal and a destination terminal from among plural transmission terminals, by sending a start request for the communication from the request source terminal which is a start request source for the communication to the destination terminal which is a start request target for the communication, comprising:

a destination list management part configured to manage a destination list indicating a candidate for the destination terminal of the request source terminal, by associating terminal identification information for identifying the request source terminal with terminal identification information for identifying the destination terminal which is the destination candidate capable of carrying out the communication with the request source terminal;

a reception part configured to receive terminal identification information of a request target terminal that is a request target of an addition request for adding a destination candidate, the terminal identification information of the request target terminal being transmitted from a PC terminal that is not managed by the destination list management part and is capable of transmitting an addition request for adding and associating, with terminal identification information of a request source terminal in the destination list, terminal identification information of a destination terminal, the terminal identification information of the request target terminal to be received by the reception part being input by a user of the PC terminal for transmitting the addition request from the PC terminal; and a transmission part configured to transmit, based on the terminal identification information of the request target terminal, an approval request for requesting for causing the approval request to be received by the request target terminal, wherein the reception part is configured to receive a request response transmitted from the request target terminal in response to the approval request, in a case where the request response indicates to approve the addition request, the destination list management part is configured to add and associate the terminal identification information of the request target terminal received from the PC terminal, as the terminal identification information of the destination terminal, with the terminal identification information of the request source terminal, and manage the added terminal identification information, the transmission part is configured to transmit the added terminal identification information of the request target terminal to the request source terminal so that the request source terminal is able to start communication with the added request target terminal based on the transmitted terminal identification information of the request target terminal, and the terminal identification information of the request target terminal to be received by the reception part being input by a user to the PC terminal for transmitting the addition request from the PC terminal is received after the PC terminal logs in using the terminal identification information of the request source terminal.

2. The transmission management system as claimed in claim 1, further comprising:

an addition request management part configured to associate the identification information of the request source terminal received by the reception part and the identification information of the request target terminal with one another, and manage the identification information, wherein in a case where the addition request response indicates to approve the addition request, the destination list management part is configured to additionally associate, for the identification information of the request source terminal in the destination list management part the same as the identification information of the request source terminal managed by the addition request management part, the identification information of the request target terminal managed in the addition request management part as being associated with the identification information of the request source terminal, as the identification information of the destination terminal, and manages the identification information.

3. The transmission management system as claimed in claim 1, further comprising:

a terminal management part configured to manage, for the identification information of the transmission terminals, operating state information indicating an operating state of the transmission terminal as being associated with the identification information, wherein in a case where the operating state indicated by the operating state information managed by the terminal management part is on-line and indicates that communication has not been started yet, the transmission part is configured to transmit to the request target terminal which is the transmission terminal having said operating state the approval request for requesting to approve the addition request, and also, the identification information of the request source terminal.

4. The transmission management system as claimed in claim 1, wherein in a case where the destination list has been sent to the request source terminal before the identification information of the destination terminal is additionally managed by the destination list management part, the transmission part is configured to transmit only the identification information of the destination terminal having been additionally managed by the destination list management part.

5. A non-transitory computer readable information recording medium storing a program which when executed by one or more processors executes the functions of the parts of claim 1.

6. A maintenance system comprising a processor and a memory carrying out maintenance of the transmission management system claimed in claim 1.

* * * * *